US010121117B1

(12) United States Patent
Boyd et al.

(10) Patent No.: US 10,121,117 B1
(45) Date of Patent: Nov. 6, 2018

(54) DRONE LOCATION SIGNATURE FILTERS

(71) Applicant: Amazon Technologies, Inc., Seattle, WA (US)

(72) Inventors: Scott Patrick Boyd, Seattle, WA (US); Chengwu Cui, Redmond, WA (US); Sarah Graber, Seattle, WA (US); Barry James O'Brien, Seattle, WA (US); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 15/260,057

(22) Filed: Sep. 8, 2016

(51) Int. Cl.
| | |
|---|---|
| *G06Q 10/08* | (2012.01) |
| *G05D 1/10* | (2006.01) |
| *G08G 5/00* | (2006.01) |
| *B64C 39/02* | (2006.01) |
| *G06K 9/00* | (2006.01) |
| *G05D 1/04* | (2006.01) |

(Continued)

(52) U.S. Cl.
CPC ......... *G06Q 10/083* (2013.01); *B64C 39/024* (2013.01); *B64D 47/08* (2013.01); *G05D 1/042* (2013.01); *G05D 1/101* (2013.01); *G06K 9/0063* (2013.01); *G08G 5/0034* (2013.01); *G08G 5/0039* (2013.01); *G08G 5/0069* (2013.01); *G08G 5/025* (2013.01); *B64C 2201/108* (2013.01); *B64C 2201/127* (2013.01); *B64C 2201/128* (2013.01); *B64C 2201/141* (2013.01); *B64C 2201/146* (2013.01); *B64C 2220/00* (2013.01)

(58) Field of Classification Search
CPC .... G06Q 10/083; G08G 5/025; G08G 5/0069; G08G 5/0039; G08G 5/0034; G06K 9/0063; B64D 47/08; B64C 39/024; B64C 2220/00; B64C 2201/108; B64C 2201/141; B64C 2201/146; B64C 2201/128; B64C 2201/127; G05D 1/042; G05D 1/101
See application file for complete search history.

(56) References Cited

U.S. PATENT DOCUMENTS

| | | | |
|---|---|---|---|
| 7,689,328 B2 * | 3/2010 | Spinelli | G01C 21/20 340/945 |
| 9,348,022 B1 | 5/2016 | Tomcsak et al. | |

(Continued)

FOREIGN PATENT DOCUMENTS

| | | | | |
|---|---|---|---|---|
| WO | WO-2013124852 A1 * | 8/2013 | | G05D 1/0676 |

OTHER PUBLICATIONS

U.S. Appl. No. 15/260,113, filed Sep. 8, 2016, Titled: Obstacle Awareness Based Guidance to Clear Landing Space.

(Continued)

*Primary Examiner* — Rodney A Butler
(74) *Attorney, Agent, or Firm* — Kilpatrick Townsend & Stockton LLP

(57) ABSTRACT

Techniques for providing a verification of a flight path or landing zone may be provided. For example, during delivery an unmanned aerial vehicle (UAV) may capture one or more images of a plurality of delivery locations within an area. A computer system may generate one or more image templates or filters using the one or more images and subsequently use the image filters to verify a flight path or landing zone for a delivery by the UAV during flight.

18 Claims, 14 Drawing Sheets

(51) Int. Cl.
*B64D 47/08* (2006.01)
*G08G 5/02* (2006.01)

(56) References Cited

U.S. PATENT DOCUMENTS

| | | |
|---|---|---|
| 9,592,912 B1 | 3/2017 | Michini et al. |
| 9,747,901 B1 | 8/2017 | Gentry |
| 9,791,866 B2 | 10/2017 | Paduano et al. |
| 2009/0138138 A1 | 5/2009 | Ferren et al. |
| 2009/0214079 A1 | 8/2009 | Hamza et al. |
| 2012/0314032 A1 | 12/2012 | Muensterer et al. |
| 2013/0021172 A1 | 1/2013 | Boedeker |
| 2013/0188008 A1 | 7/2013 | Meadow et al. |
| 2014/0132563 A1 | 5/2014 | Schediwy et al. |
| 2014/0316243 A1 | 10/2014 | Niedermeyer |
| 2014/0379179 A1 | 12/2014 | Goossen et al. |
| 2015/0120094 A1 | 4/2015 | Kimchi et al. |
| 2015/0158587 A1 | 6/2015 | Patrick et al. |
| 2015/0323932 A1 | 11/2015 | Paduano et al. |
| 2015/0367956 A1 | 12/2015 | Loussides et al. |
| 2016/0068264 A1 | 3/2016 | Ganesh et al. |
| 2017/0015438 A1 | 1/2017 | Harding et al. |
| 2017/0023473 A1 | 1/2017 | Wegner et al. |
| 2017/0023946 A1 | 1/2017 | Humphrey |
| 2017/0045894 A1 | 2/2017 | Canoy et al. |
| 2017/0075359 A1 | 3/2017 | Wang |
| 2017/0110017 A1 | 4/2017 | Kimchi et al. |
| 2017/0116867 A1 | 4/2017 | Cherepinsky et al. |
| 2017/0139409 A1* | 5/2017 | Clarke ................. G05D 1/0011 |
| 2017/0197710 A1 | 7/2017 | Ma |
| 2017/0212528 A1 | 7/2017 | Henderson |
| 2017/0235300 A1 | 8/2017 | Maruno et al. |
| 2017/0244270 A1 | 8/2017 | Waters |
| 2017/0253320 A1 | 9/2017 | Baran et al. |
| 2017/0259912 A1 | 9/2017 | Michini et al. |
| 2017/0269596 A1 | 9/2017 | Wang et al. |
| 2017/0275023 A1 | 9/2017 | Harris et al. |
| 2017/0278410 A1* | 9/2017 | Byers .................... B64C 39/024 |
| 2017/0308100 A1 | 10/2017 | Iskrev et al. |
| 2017/0351933 A1* | 12/2017 | Bleiweiss .............. G06K 9/627 |
| 2017/0371353 A1* | 12/2017 | Millinger ............... G05D 1/101 |
| 2018/0046187 A1* | 2/2018 | Martirosyan ........ G05D 1/0094 |
| 2018/0068185 A1* | 3/2018 | Schultz ............. G06F 17/30256 |

OTHER PUBLICATIONS

U.S. Appl. No. 15/260,162, filed Sep. 8, 2016, Titled: Drone Marker and Landing Zone Verification.

* cited by examiner

DRONE LOCATION SIGNATURE FILTERS

BACKGROUND

A delivery service may deliver items to its customers using one of a variety of different means. For example, an item ordered by a customer from an electronic marketplace may be removed from a shelf in a warehouse and delivered to the customer's doorstep by a delivery person. In some cases, the item may also be transported by other means such as automated or semi-automated means. For example, a network-based resource may provide an option to deliver the item to a delivery location via an unmanned aerial vehicle (UAV). However, deliveries made by UAVs may be prone to problems such as aborted deliveries because of obstructed landing zones or an incapability to find or verify a delivery location during flight.

BRIEF DESCRIPTION OF THE DRAWINGS

Various embodiments in accordance with the present disclosure will be described with reference to the drawings, in which.

DETAILED DESCRIPTION

Figure 1:
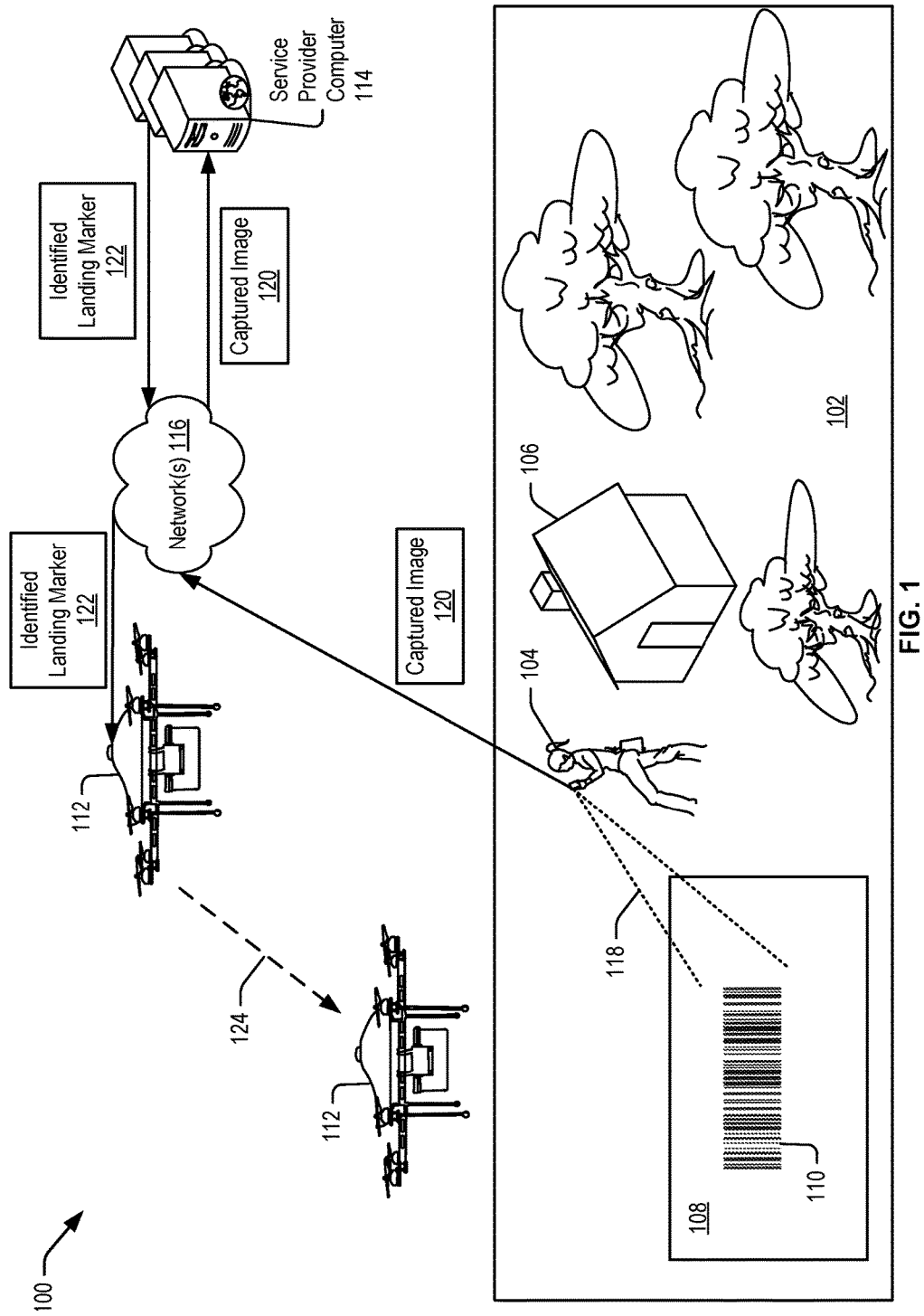
FIG. 1 illustrates an example environment for a marker and landing zone verification feature for a UAV delivering an item, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, verifying a marker and landing zone for a UAV during delivery of a payload, such as one containing an item ordered from a network-based resource. In particular, a server computer (a service provider computer) that is configured to implement features described herein may receive and analyze images provided by users that have ordered an item from a network-based resource. The images may include an area, such as a designated landing zone that includes a landing marker that is associated with the user, such as images of a user's yard, driveway, or other corresponding area. In embodiments, the landing marker may include a barcode, a quick response (QR) code, or any suitable machine readable unique identifier. The images received by the server computer and provided by a user's computing device, such as a mobile phone, may be processed using an image processing algorithm that transforms a viewpoint of the image, extracts extraneous information, and abstracts the image to a two dimensional (2D) map or other suitable image that more easily identifies the landing marker in the landing zone. In some embodiments, the images may be utilized to identify the landing marker when the camera component of an associated UAV is incapable of locating the landing marker. The image that includes the landing marker may be provided to the UAV along with instructions that guide the UAV to deliver the item to the landing zone by using the identified landing marker. In various embodiments, additional images that are captured by the UAV during flight may be utilized to identify the landing marker in the landing zone.

For example, a user may order a pair of tennis shoes from a network-based resource and request delivery via a UAV. In response, a server computer associated with the network-based resource may instruct the UAV to deliver the tennis shoes to a delivery location associated with the user. Simultaneously, instructions may be provided to the user that request one or more images of the intended landing zone and landing marker that correspond to the user's home. Upon receiving the images, the server computer may analyze the images, transform, and extract information to identify the landing marker in the landing zone. In embodiments, the identification of the landing zone in the landing marker may be provided to the UAV which will aid in guiding the UAV to deliver the item in the landing zone via the landing marker.

In some embodiments, the images captured by a user device and the UAV during flight may be utilized to identify a potential landing zone absent a landing marker to enable delivery of an ordered item. For example, images captured by a UAV upon arriving at a delivery location may be analyzed to identify an appropriate landing zone to deliver the item. In embodiments, an appropriate landing zone may include an area or zone of specific dimensions that is associated with a user's delivery location, free from obstructions or obstacles, and of a suitable terrain that allows a UAV to safely descend to deliver the item and ascend to a certain altitude. In various embodiments, a notification may be provided by the UAV, via auditory or visual components, that a suitable landing zone has been located in a user's delivery location. In some embodiments, a server computer may generate and provide to a user device a notification of the identification of a suitable landing zone. In accordance with at least one embodiment, a user profile may be generated and maintained by the server computer that identifies the landing zone, landing marker, or potential landing zones associated with a user based on previously submitted images from a user device or the UAV.

In various embodiments, when a user provides images of an area associated with their delivery location, either voluntarily or upon request, the server computer may determine that the provided images are of poor quality or lack any suitable information to identify a landing zone or landing marker. In such situations, a request may be provided to a user device of a user indicating that additional images be captured of the landing zone, landing marker, or any combination thereof. In some embodiments, a request may be provided to a user to capture images of the landing zone or landing marker from one or more different angles or viewpoints (i.e., frontal, profile, aerial (when possible), or worm's eye view). A user may utilize a user device to capture or obtain a video, live stream, or other suitable media file of the landing zone and landing marker and provide said media files to the server computer to aid in identifying and verifying the location of the landing marker within the landing zone. In embodiments, the UAV may utilize an associated delivery mechanism, such as a tether, to lower the item onto the landing marker to complete delivery. In some embodiments, the UAV may descend and land in the landing zone on the landing marker and release the item before ascending to an appropriate altitude for a return flight to an origination location.

In some embodiments, a user may interact with their associated user device (i.e., laptop computer, desktop computer, mobile phone, wearable device, gaming device, tablet computer, etc.,) or an application of the user device to tag or identify one or more objects in the images before providing them to the server computer for analyzing. The tag information may be utilized by the image processing algorithm to remove or abstract unnecessary information from the image and aid in identifying the landing marker in the landing zone. In various embodiments, metadata or image capture information may be provided with the images or media files provided to the server computer. The metadata or image capture information may include capture conditions such as illumination level, light exposure, or other suitable image capture information and device capability information such as exposure time, lens magnification, etc. In some embodiments, the user profile for a user may include information about recurring patterns for a user's landing zone, delivery location, or area. For example, the patterns may identify things such as trees, a pool, an outdoor grill, etc., that may be used for scale or verification of the user's delivery location, landing zone, and/or landing marker. In accordance with at least one embodiment, the server computer may provide an application that presents an augmented reality layover or presentation that can be used to capture images of a user's landing zone and/or landing marker. The augmented reality information and images captured utilizing such features may be analyzed by the server computer to identify the landing marker, verify the delivery location, and guide the UAV to deliver the item using the landing marker. In some embodiments, information about a delivery location may be obtained or requested from a third party entity, such as a government entity. The information may include plot information for a user's land, architecture plans, or other suitable information about a user's delivery location.

In embodiments, image processing algorithms may include identifying an item in an image and a scale for said item may be determined using an item catalog maintained by an electronic marketplace. Suitable image processing or item recognition may include analyzing barcodes or labels associated with an item included in the image. The barcodes or labels included in the image may be matched against a barcode or label database to identify the item in the image. In some embodiments, an image may be analyzed via an algorithm to determine image characteristics for each item included in an image. In various embodiments, optical character recognition can be utilized to process labels or tags associated with an item in the image and matched to labels or tags of other items maintained in an item catalog. In embodiments, an image processing algorithm can fragment a picture into multiple portions and process each portion individually to identify items included in an image. In some implementations, a user can individually identify or tag regions or items included in the image to enable an algorithm to identify the items included in the image.

In some embodiments, a user device and/or the UAV may utilize one or more cameras to act as a stereo camera to capture images of the landing zone and/or landing marker. For example, a user device may be configured to utilize a first camera at a first position and a second camera at a second position to capture an image frame that simulates binocular vision. In some embodiments, binocular vision may be simulated using any suitable combination of lenses (e.g., two lenses) and image sensors, which may include one lens, one sensor, and suitable software and hardware to simulate binocular vision. In embodiments, suitable image processing algorithms may generate a depth map for use in identifying a landing marker in a landing zone and/or a potential landing zone in an area associated with a user. In accordance with at least one embodiment, a depth map may include any suitable information that indicates relative distances and positions of surfaces of objects from a viewpoint. In embodiments described herein, the image processing algorithms may utilize stereo triangulation using stereoscopic camera(s) and structured light using an infrared light source to generate a 3D image of an object and generate a corresponding depth map. Calibration information, including distance from an infrared device to an object, may be captured by an infrared device or inferred from a point of reference and can include any suitable information for calibrating dimensions of an object in the 3D image.

Calibration information may indicate the distance from a 3D or 2D imaging device to an object and can include utilizing a laser reference point, dimension information associated with a known object such as a quarter, environmental cues such as other objects in the background of the image, etc. The image processing algorithms may utilize edge detection techniques that utilize first or second derivatives, equivalently, to detect large changes in pixel averages/values or a local region which can be used to determine when an edge is likely to exist. Edges of images can be thought of as outlines in some cases or patterns in others. Image processing algorithms may utilize template matching that utilizes patterns garnered from edge detection for determining what an object is utilizing the outline of the image or the pattern of the image. Template matching may include utilizing samples of known reference objects at multiple translations/rotations/scales and then compared to templates using convolution or related cross-correlation operators to check for overall match. In some embodiments, scale invariant feature transforms or simultaneous localization and mapping techniques may be performed in conjunction with image recognition described herein for image algorithm processing. Further, background segmentation may be performed on the 3D image, 2D image, or image captured by the user device and/or UAV by applying histograms to the image. The histograms may be utilized as a pre-processing technique for performing routine background segmentation, such as separating a landing marker from the background of a landing surface, such as a cement drive way.

In embodiments, the server computer may be configured to receive and analyze images captured by a UAV during flight to deliver an item to a user or from an associated user device to identify one or more objects and/or items in the landing zone. In some embodiments, the server computer may generate instructions that can be transmitted to a user device that instruct a user to move the identified objects or items from the landing zone and/or landing marker to enable safe delivery of the item by the UAV. In some embodiments, the server computer may generate an image with the offending objects/items highlighted, outlined, or otherwise indicated as offending and causing a safety or obstruction that is prohibiting the UAV from delivering the item in a landing zone associated with a user. The image with the identified objects may be provided to a user device of a user or an application of the user device. In various embodiments, the UAV may utilize auditory and visual components to inform the user about the objects or items in the landing zone and provide instructions for moving the objects/items from the landing zone and or marker.

In some embodiments, where a user utilizes a landing marker for a landing zone, the server computer may identify another potential landing zone within a user's delivery location and instruct the user to move the landing marker to the potential landing zone. The server computer may identify the potential landing zone utilizing images captured by the UAV during flight and/or images captured by a user with an associated user device. Once the offending objects or items have been removed, the UAV may be given instructions to land in the landing zone and deliver an item to the user. In embodiments, the UAV may attempt to communicate with the user for a certain time period when an object or item is identified in the landing zone before aborting the delivery mission. The time period may be determined based on an amount of power/fuel/charge required to return to an origination location for the UAV and a weight of the payload. In some embodiments, when a user does not or cannot respond to requests to remove the offending items or obstructions from a landing zone, the server computer may transmit the same instructions to a default user, such as a pre-approved neighbor or friend, to move the items or obstructions from the landing zone of a user. In various embodiments, the server computer may utilize images captured by the UAV during flight to identify another potential landing zone in a neighbor location or proximally close location to the user. The identification of the other potential landing zone may be based in part on the user and the neighboring user opting-in to a UAV delivery service or to serve as an alternate UAV delivery location for friends and neighbors. The server computer may utilize features described herein to identify that the other potential landing zone in a neighbor location is also clear of obstructions or items that would prohibit the delivery of the item by the UAV.

As described herein, items or objects identified in a landing zone and/or near a landing marker may be identified based on image recognition techniques that leverage an item catalog of a networked-based resource, such as an electronic marketplace. The item catalog information can be utilized to properly identify offending items, dimensions, and determine move distances required to remove the object from the landing zone or interpret whether the item can be moved from the landing zone or whether a new potential landing zone should be identified. In various embodiments, the UAV may be associated with one or more sensors that are configured to emit and receive a signal that identifies a sound propagation of the surrounding environment. Based on the sound propagation of the surrounding environment, a terrain type or delivery surface may be inferred. The server computer may maintain one or more policies that prohibit delivery upon certain surfaces such as water or mud.

In accordance with at least one embodiment, the server computer may generate, maintain, and update a plurality of image filters that may serve as image templates for one or more delivery locations in an area such as a city or town. The image filters may be generated using a series of images captured by a UAV during delivery of an item and/or provided by user devices of users requesting UAV deliveries as described herein. The server computer may extract or abstract certain information from the series of images to generate an image template. In some embodiments, the image template may include a 2D map of a particular location that identifies a landing zone and a landing marker for the particular location. In various embodiments, the image filters may include a map of obstructions or potential obstructions for a UAV such as radio towers, high rise buildings, tall trees, or other suitable obstacles that may include objects or dimensions of objects not conveyed by global positioning satellite information. In embodiments, the image filters may be utilized to verify a flight path or flight plan for a UAV during flight to deliver an item. For example, a UAV can periodically or continuously provide captured images to the server computer which may be compared to the plurality of image filters to verify the UAV's location, heading, and path. In embodiments, the image filters may also be utilized to verify a particular delivery location by comparing an image captured by a UAV upon arriving at the particular delivery location to the image filter for the particular delivery location.

In embodiments, the plurality of image filters can be utilized to generate a flight plan or path that avoids certain locations, such as locations for users that have opted-out from a UAV item delivery service, thereby avoiding said locations but still generating an efficient path for the UAV to deliver an item to an opted-in user. In embodiments, an updated flight plan may instruct the UAV to climb to a particular altitude before flying over an opted-out user and return to lower altitude when flying over an opted-in user. In some embodiments, the plurality of image filters can be utilized to identify one or more emergency landing zones from participating users in response to a mechanical failure or component failure of the UAV. In accordance with at least one embodiment, the server computer may maintain one or more thresholds that identify a limit of changes or updates to an image filter for a particular location. Upon exceeding a threshold, the server computer may communicate with a user that corresponds to the particular location and informing them of the recognized updates, trends, or out of place structures, items, etc. Some locations such as a warehouse or business may warrant the use of a higher threshold than a house for a user as a user's landing zone (i.e., yard or driveway) may experience daily changes whereas a business may not see many changes within a given time period. In some embodiments, the image filters or templates can be used to generate a flight plan that instructs the UAV's associated propellers to modulate at certain rotations per minute (RPM) and thereby generate an expected sound when traveling near opt-in users versus opt-out users.

FIG. 1 illustrates an example environment for a marker and landing zone verification feature for a UAV delivering an item, according to embodiments. FIG. 1 illustrates an example dataflow 100 for verifying a landing marker in a landing zone of an area 102 associated with a user 104. In embodiments, the area may correspond to a delivery location of the user 104. Examples of a delivery location may include a yard such as a backyard or front yard of a user's home, an associated driveway or alleyway, or a nearby street. As depicted in FIG. 1, the area 102 includes a home 106, a landing zone 108, and a landing marker 110 that may include a machine readable identifier such as a barcode that serves as the landing marker 110. In embodiments, the user 104 may utilize a user device or user computing device to order an item for delivery from a network-based resource via UAV 112. The network-based resource may be associated with a service provider computer 114 that implements features described herein including verification of a landing zone and maker in an area. The user 104 (via a user device), UAV 112, and service provider computer 114 may communicate via one or more available networks 116 such as the Internet.

In embodiments, the service provider computer 114 may request and/or receive one or more captured 118 images 120 of the landing zone 108 and landing marker 110. The user 104 may utilize a user device to capture 118 the images 120 of the landing zone 108 and landing marker 110. In embodiments, the service provider computer 114 may provide instructions to the user 104 via the user device to capture additional images from one or more angles or view points of the landing zone 108 and landing marker 110. In some embodiments, the user 104 may capture a movie, video, or stream a live stream media file to the service provider computer 114, via networks 116, of the landing zone 108 and landing marker 110. In accordance with at least one embodiment, the service provider computer 114 may analyze the provided images 120 to identify the landing marker 110 in the landing zone 108 of area 102.

As described herein, the service provider computer 114 may be configured to utilize one or more image processing algorithms to transform or translate the image 120 to an aerial view representative of an image that could be captured by UAV 112 of the landing zone 108 and landing marker 110. The image processing algorithms may extract certain information and utilize information provided with the captured image 120 such as device capabilities of the user device or conditions of the captured image 120 such as illumination, lens focus, etc., to generate a 2D map, a 3D map, or a 2D or 3D depth map of the landing zone 108 and landing marker 110. The information may be provided as metadata with the image 120 to the service provider computer 114. In some embodiments, the captured images 120 may be utilized to identify the presence and location of the landing marker 110 within the landing zone 108. Once the landing marker has been identified 110, information and instructions regarding the identified landing marker 122 may be provided to the UAV 112 via networks 116. As illustrated in FIG. 1, the UAV 112 may utilize the instructions and identified landing marker 122 to guide itself to land in the landing zone 108 and deliver the item ordered by user 104 on the landing marker 110. In some embodiments, the instructions provided by the service provider computer 114 may guide the UAV 112 to deliver the item to the landing marker 110 in the landing zone 108.

Figure 2:
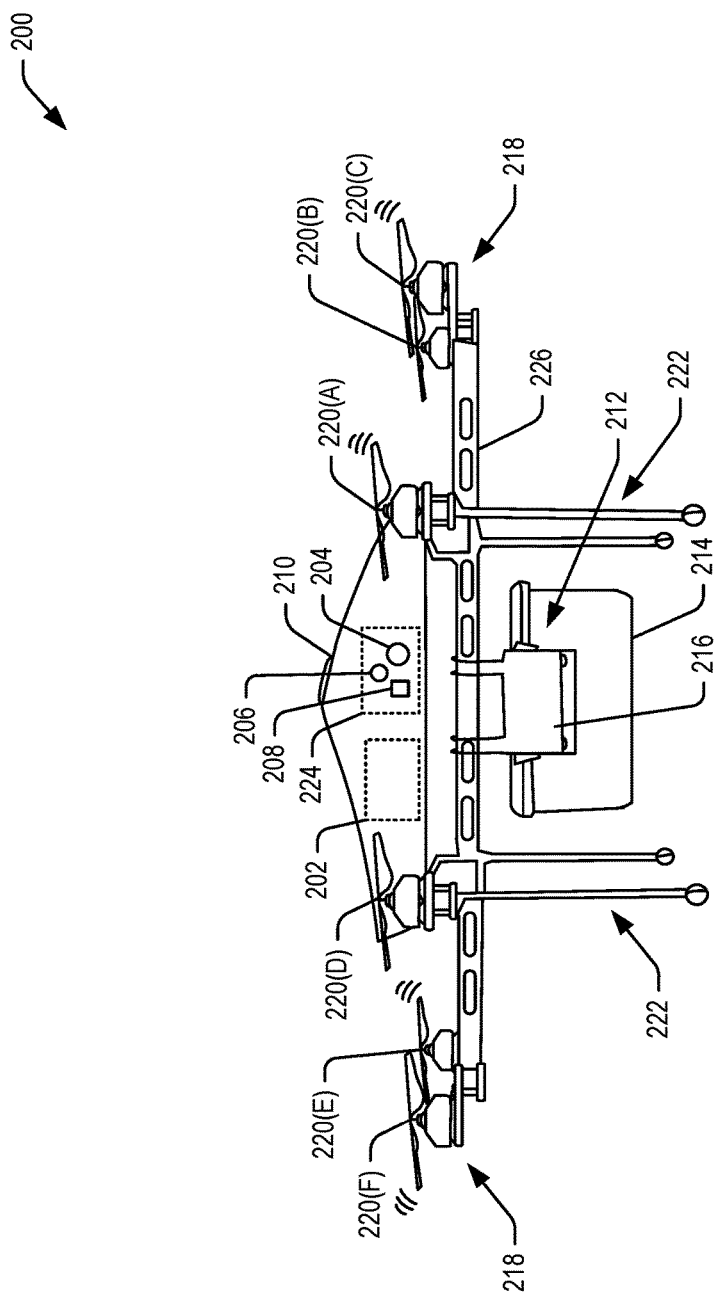
FIG. 2 illustrates an example unmanned aerial vehicle configured to deliver an item, according to embodiments.

FIG. 2 illustrates an example unmanned aerial vehicle configured to deliver an item, according to embodiments. The UAV 200 is an example of the UAV 112 discussed with reference to FIG. 1. The UAV 200 may be designed in accordance with commercial aviation standards and may include multiple redundancies to ensure reliability. For purposes of this specification, the UAV 200 may include a plurality of systems or subsystems operating under the control of, or at least partly under the control of, a management system 202. The management system 202 may include an onboard computer for autonomously or semi-autonomously controlling and managing the UAV 200 and, in some examples, for enabling remote control by a pilot. The onboard computer will be discussed in more detail with reference to FIG. 8. Portions of the management system 202, including the onboard computer, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), radio-frequency identification (RFID) capability (not shown), and interfaces capable of speech interpretation and recognition (not shown).

The UAV 200 may also include a communication system 224 housed within the top cover 210. The communication system 224 may include one or more light sensors 204 (e.g., imaging device, depth sensor, visible light camera, infrared camera, RGB camera, depth aware camera, infrared laser projector, ultraviolet sensitive cameras, scanning sensor, light filters, image capture device or component, and any combination of the foregoing), one or more auditory sensors 206 (e.g., microphone, noise filters, and other sensors for capturing sound), and one or more output devices 208 (e.g., microphone, speaker, laser projector, light projector, and other devices for outputting communication information). The management system 202 may be configured to receive information and provide information via components of the communication system 224. For example, information may be received (e.g., images of an area) via the image capture device and the identification of objects in a landing zone may be provided (e.g., verbal statements, requests, or questions using the speech interface, flashing lights, and other ways discussed herein for providing information) via the output device 208. Thus, in some examples, the UAV 200 may support two-way communication with users. Two-way communication may be beneficial for verifying a potential recipient's identity, for posing questions to a potential recipient or to other human users, and for providing instructions to a potential recipient or to other users, e.g., relating to delivery of a package or removal of objects from a landing zone and/or moving a landing marker to a newly designated landing zone. In some examples, the communication system 224 may operate semi-autonomously or autonomously.

As shown in FIG. 2, the UAV 200 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. The management system 202 may be configured to control at least a portion of the retaining system 212. In some examples, the retaining system 212 may be configured to release the payload 214 in one of a variety of ways. For example, the retaining system 212 (or other system of the UAV 200) may be configured to release the payload 214 with a winch and spool system or tether system, by the retaining system 212 releasing the payload, and other methods of releasing the payload. In some examples, the retaining system 212 may operate semi-autonomously or autonomously.

In FIG. 2, the payload 214 is illustrated as a delivery box. In some examples, the delivery box may include one or more packages or items intended for delivery to a recipient using the techniques described herein. The payload 214, whether as a delivery box or otherwise, may be configured for delivery using a variety of different methods. For example, the payload 214 may include a parachute that opens and slows the payload's 214 descent as it falls to its delivery location. In some examples, the payload 214 may include padding surrounding its package to reduce the impact of a drop from the UAV 200 above the ground. The UAV 200 may also deliver the payload 214 by fully landing on the ground and releasing the retaining system 212.

Further, the UAV 200 may include propulsion system 218. In some examples, the propulsion system 218 may include rotary blades or otherwise be a propeller-based system. In some examples, the propulsion system 218 may include or be associated with one or more fixed wings. As illustrated in FIG. 2, the propulsion system 218 may include a plurality of propulsion devices, a few of which, 220(A)-220(F), are shown in this view. Each propeller device may include one propeller, a motor, wiring, a balance system, a control mechanism, and other features to enable flight. In some examples, the propulsion system 218 may operate at least partially under the control of the management system 202. In some examples, the propulsion system 218 may be configured to adjust itself without receiving instructions from the management system 202. Thus, the propulsion system 218 may operate semi-autonomously or autonomously. The propulsion system 218 may enable multi-directional flight of the UAV 200 (e.g., by adjusting each propeller device individually). The propulsion system 218 may be configured to module the propulsion devices 220 (A)-220(F) at particular RPMs to enable generation of a certain sound by the UAV 200. The UAV 200 may also include landing structure 222. The landing structure 222 may be adequately rigid to support the UAV 200 and the payload 214. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

Figure 3:
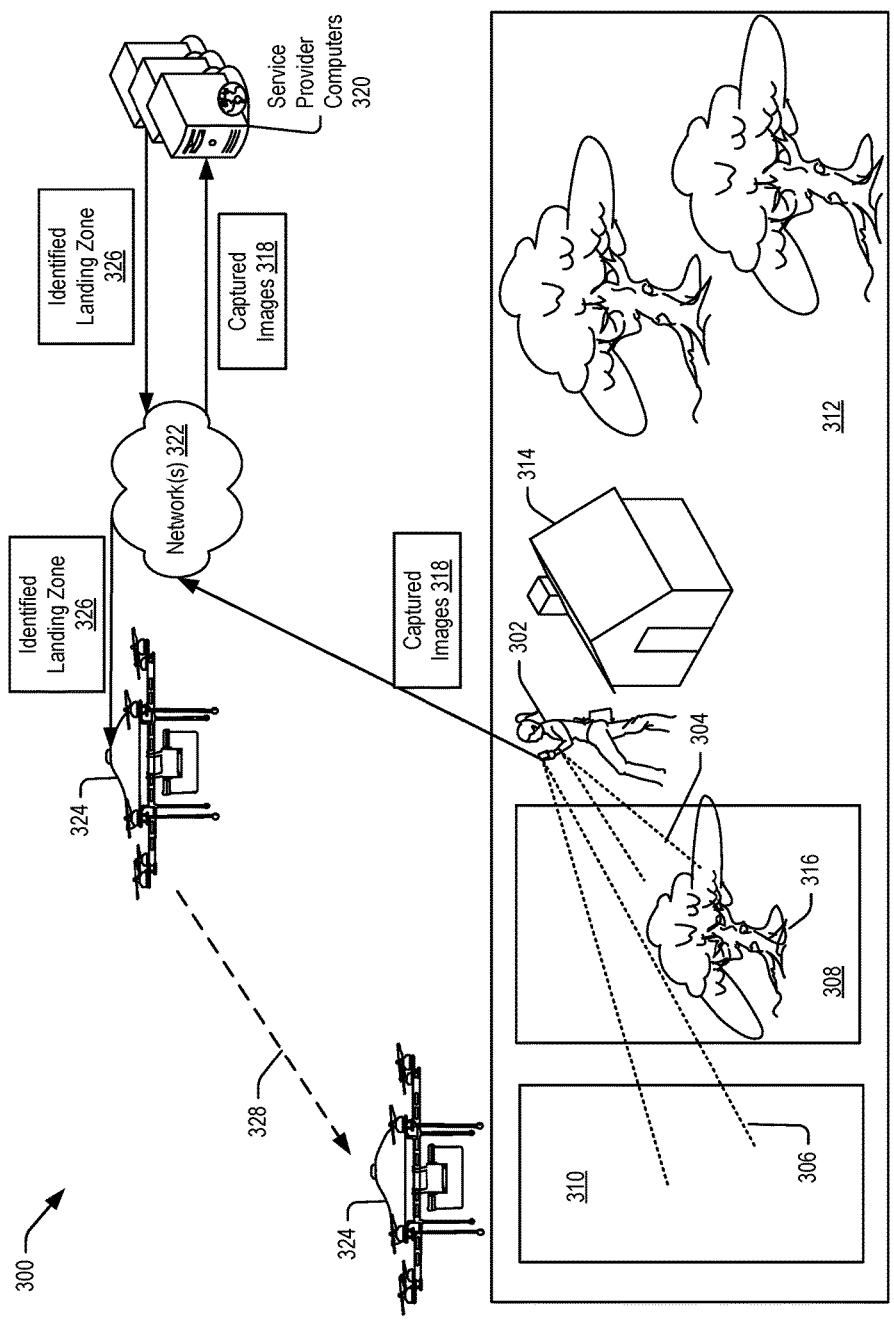
FIG. 3 illustrates an example environment for a marker and landing zone verification feature for a UAV delivering an item, according to embodiments.

FIG. 3 illustrates an example environment for a marker and landing zone verification feature for a UAV delivering an item, according to embodiments. FIG. 3 illustrates an example dataflow 300 for a landing zone identification and verification for use by a UAV delivering an item to a delivery location associated with a user. As depicted in FIG. 3, a user 302 may utilize a user device (such as a tablet computer) to capture 304 and 306 a plurality of images of a first area 308 and a second area 310 of an associated delivery location 312.

In FIG. 3, the delivery location may be the user's 302 yard that corresponds to their home 314. The first area 308 may include one or more structures or objects 316 such as a tree, bush, or other immovable and/or movable object. In accordance with at least one embodiment, the user 302 may transmit the captured images 318 to service provider computers 320 via networks 322. As illustrated in FIG. 3, the first area 308 and second area 310 do not include a landing marker. In embodiments, a UAV, such as UAV 324, may deliver an item ordered by user 302 without the aid or use of a landing marker. Instead, the UAV 324 may deliver the item to a landing zone that is free from objects or other obstructions and adheres to certain dimensions which ensure the safety of the UAV and the item being delivered.

In accordance with at least one embodiment, the service provider computers 320 may be configured to utilize the captured images 118 to identify a potential landing zone within the delivery location 312, perhaps in either first area 308 or first area 310. In embodiments, the service provider computers 320 may utilize more images or information obtained or captured by UAV 324 about the delivery location 312, first area 308, or second area 310 to determine an appropriate potential landing zone. As described herein, a potential landing zone may comprise an area of certain dimensions that is free of the presence of objects or obstructions to ensure a safe descent by UAV 324 to deliver the item in the potential landing zone. In embodiments, the service provider computers 320 may utilize the image processing algorithms to identify the presence of an object 316 (tree) in the first area 308 which may prohibit the safe descent and delivery of the item by UAV 324.

However, the service provider computers 320 may identify a potential landing zone 326 in the second area 310 that meets the dimension requirements for the UAV 324 and is free from objects or obstructions. In embodiments, the service provider computers 320 may provide information and instructions about the identified landing zone 326, via networks 322, to the UAV 324 to guide 328 the UAV 324 to deliver the item to the second area 310. In some embodiments, the service provider computers 320 may be configured to generate, maintain, and update a user or customer profile for user 302. The user or customer profile may identify potential landing zones in an associated delivery location 312, objects detected in certain landing zones such as tree 316, and nature and number of images, movies, or video streams captured by user 302 utilizing a user device. In some embodiments, the user or customer profile may identify and maintain information that identifies a type of device utilized to capture the images 318. Preferences of device type and media utilized to capture the first area 308 and second area 310 may be utilized to provide relevant instructions to user 302 concerning the delivery of an item by UAV 324.

Figure 4:
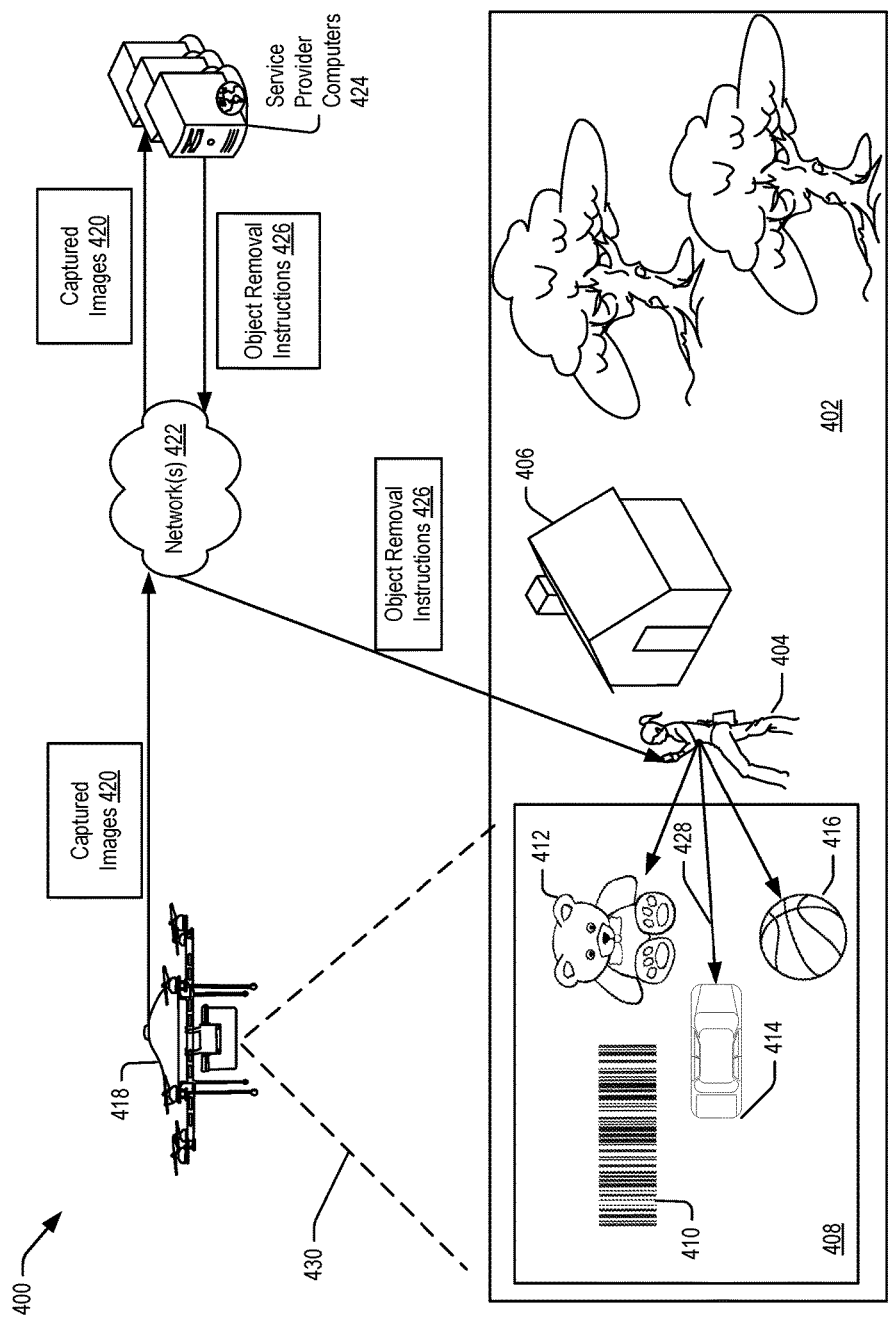
FIG. 4 illustrates an example environment for a marker and landing zone verification feature for a UAV delivering an item, according to embodiments.

FIG. 4 illustrates an example environment for a marker and landing zone verification feature for a UAV delivering an item, according to embodiments. FIG. 4 illustrates an example dataflow 400 for an object detection and removal feature described herein for a UAV attempting to deliver an item. In embodiments, a UAV may attempt to deliver an item to a location associated with a user that ordered the item. However, safety protocols and procedures may indicate that the UAV is unable to deliver the item should objects or obstructions block, impinge, or otherwise get in the way of the UAV trying to deliver the item. In such situations the UAV may abort the delivery mission. Methods and systems described herein provide solutions for delivering the item, via the UAV, to a user when obstructions or items would otherwise prohibit delivery of the item. For example, FIG. 4 includes an area 402 that may serve as an associated delivery location for user 404. The area 402 may include a house 406, a landing zone 408, and a landing marker 410. As depicted in FIG. 4, the landing zone may include one or more items or objects 412, 414, and 416. The items or objects 412-416 presence within the landing zone 408 may prohibit the safe landing of UAV 418 to deliver an item ordered by user 404. For example, one of the objects may be of certain physical dimensions that the UAV 418 may be unable to land safely without running into the object, tipping over and/or crashing to a surface. In other examples, an object may impede or otherwise cover the landing marker 410 which may prohibit the guidance instructions for landing the UAV 418 to deliver the item.

In accordance with at least one embodiment, the UAV 418 may capture or obtain one or more images 420 for the area 402, landing zone 408, and landing marker 410. The UAV 418 may transmit the captured images 420 via networks 422 to service provider computers 424 (the dashed lines 430 may represent the viewing field and capture range for the images 420 by UAV 418 and associated image capture components which may include a stereo camera). In some embodiments, the user 404, utilizing a user device, may capture similar images of the area 402, landing zone 408, and landing marker 410 to provide to the service provider computers 424 via networks 422. As described herein, the service provider computers 424 may utilize image processing algorithms which include item recognition techniques to identify the presence of the objects or items 412, 414, and 416 within the landing zone 408. In embodiments, the physical dimensions of the objects 414, 414, and 416 may be calculated by the service provider computers 424 that leverage an associated item catalog that corresponds to an electronic marketplace. In some embodiments, policies or thresholds may dictate that the presence of any object or item in the landing zone 408 prohibits the UAV 418 from landing to deliver the item.

The service provider computers 424 may generate and transmit object removal instructions 426 to the user 404 via an associated user device. The user may be given a certain time period to remove 428 the objects 412, 414, and 416 from the landing zone 408 to enable the UAV 418 to deliver an ordered item. The certain time period may be determined based in part on a distance between the delivery location or area 402 and an origination location for the UAV 418 and a current fuel, power, or charge level for the UAV 418. In various embodiments, the object removal instructions 426 may be provided to the user 404 and associated user device via a short message service (SMS) text message, an email, a notification to an application, or other suitable means such as a phone call from a service representative of an electronic marketplace. In some embodiments, the object removal instructions 426 may include an image of the landing zone 408, landing marker 410, area 402, and the offending items/objects 412, 414, and 416. The objects 412, 414, and 416 may be highlighted, outlined, or otherwise indicated to inform the user that they need to be removed or moved from the landing zone 408 to enable delivery of an ordered item by UAV 418. In some embodiments, the UAV 418 may utilize one or more auditory or visual components to provide object removal instructions 426 directly to the user. For example, the UAV 418 may be configured to provide two-way communication to the user 404 via a microphone and a speaker component. In another example, the UAV may utilize visual components to provide different colored lights or other visual cues that highlight and instruct removal of the objects 412, 414, and 416 from the landing zone 408.

Figure 5:
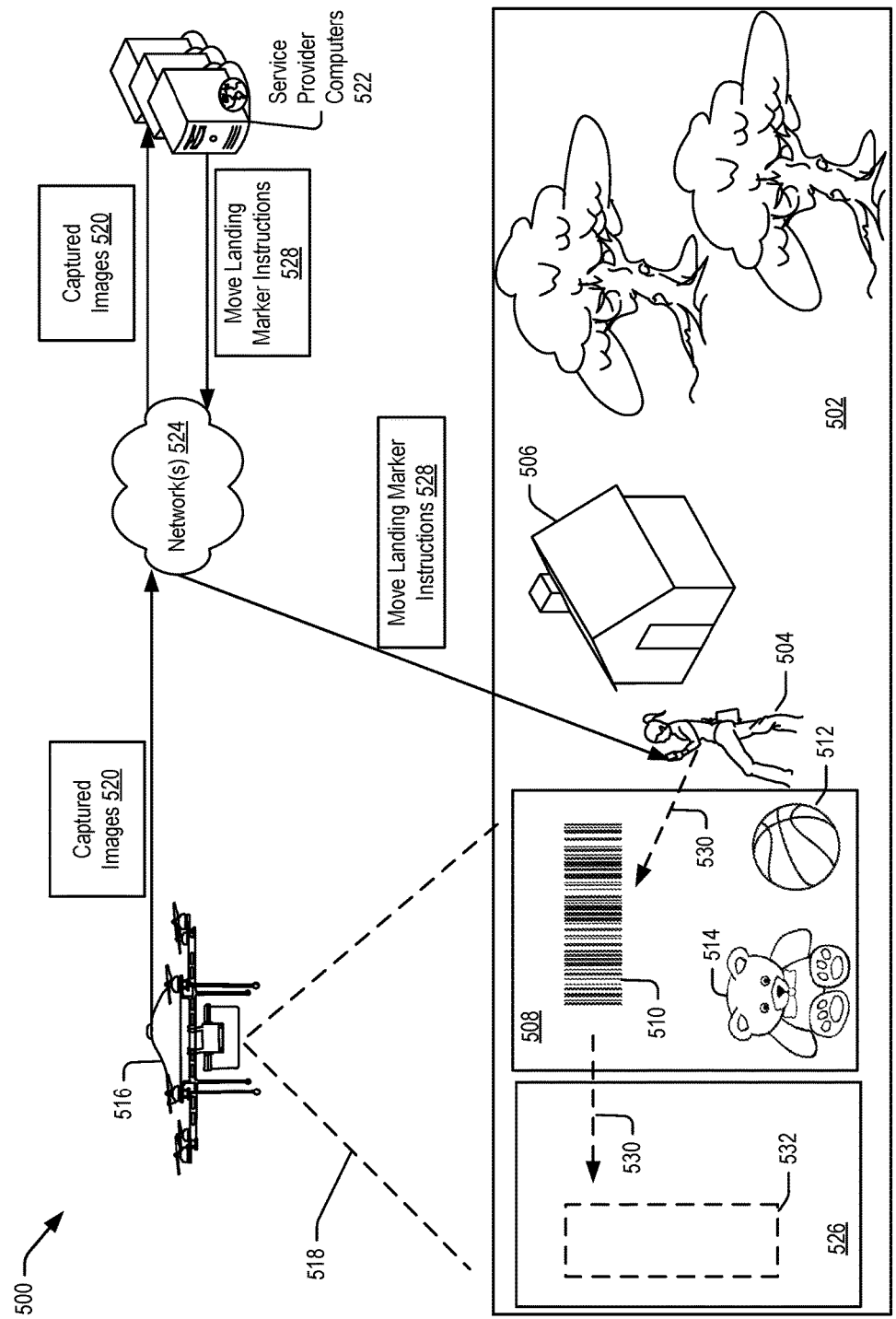
FIG. 5 illustrates an example environment for a marker and landing zone verification feature for a UAV delivering an item, according to embodiments.

FIG. 5 illustrates an example environment for a marker and landing zone verification feature for a UAV delivering an item, according to embodiments. FIG. 5 illustrates an example dataflow 500 for an object detection and removal feature described herein for a UAV attempting to deliver an item. FIG. 5 includes an area 502 that may serve as an associated delivery location for user 504. The area 502 may include a house 606, a landing zone 508, and a landing marker 510. As depicted in FIG. 5, the landing zone may include one or more items or objects 512 and 514. The items or objects 512 and 514 presence within the landing zone 508 may prohibit the safe landing of UAV 516 to deliver an item ordered by user 504. For example, the objects 512 and 514 may obstruct the landing zone 508 prohibiting a safe descent by UAV 516 to deliver the item or may obstruct the landing marker 510 thereby prohibiting the safe guidance of the UAV 516 to the landing zone 508.

In embodiments, the UAV 516 may capture 518 one or more images 520 of the area 502, landing zone 508, landing marker 510, objects 512 and 514, and home 506. The UAV 516 may utilize associated image capture components to capture 518 the one or more images 520. In some embodiments, the images 520 may be supplemented by images captured by a user device of user 504 of the area 502, landing zone 508, landing marker 510, and objects 512 and 514. As described herein, the UAV 516 may be configured to transmit the captured images 520 to service provider computers 522 via networks 524. In accordance with at least one embodiment, the service provider computers 522 may be configured to identify and determine a potential landing zone 526 within area 502 utilizing the captured images 520. For example, the service provider computers 522 may determine dimensions required to safely land the UAV 516 within the area 502 that is different from the previously identified landing zone 508. In some embodiments, the service provider computers 522 may utilize dimensions determined and identified for the objects 512 and 514, using an item catalog, to determine an appropriate distance to move the landing marker 510 to the potential landing zone and thereby create a safe and unobstructed area to allow the UAV 516 to land and deliver an item.

In accordance with at least one embodiment, the service provider computers may generate instructions to move the landing marker 528 which may be transmitted, via networks 524, to a user device of user 504. The instructions may instruct and/or guide the user 504 to move 530 (as represented by the dashed arrow) the landing marker 510 to the identified potential landing zone 526. The potential landing zone 526 may be of sufficient dimensions to allow safe descent by the UAV 516 to deliver the item ordered by user 504. Further, the potential landing zone 526 may include an area 532 to place, fit, or move the landing marker 510 to serve as a temporary landing zone or new permanent landing zone depending on input from the user 504 and/or patterns recognized by service provider computers 522 utilizing the captured images 520. Upon the user moving 530 the landing marker 510 to the new area 532 in the potential landing zone 526, the UAV may obtain or capture additional images of the area 502 and potential landing zone 526 to verify that the zone is free of any objects, items, or obstacles. Thereafter, the UAV 516 may land in the potential landing zone 526 to deliver an item.

Figure 6:
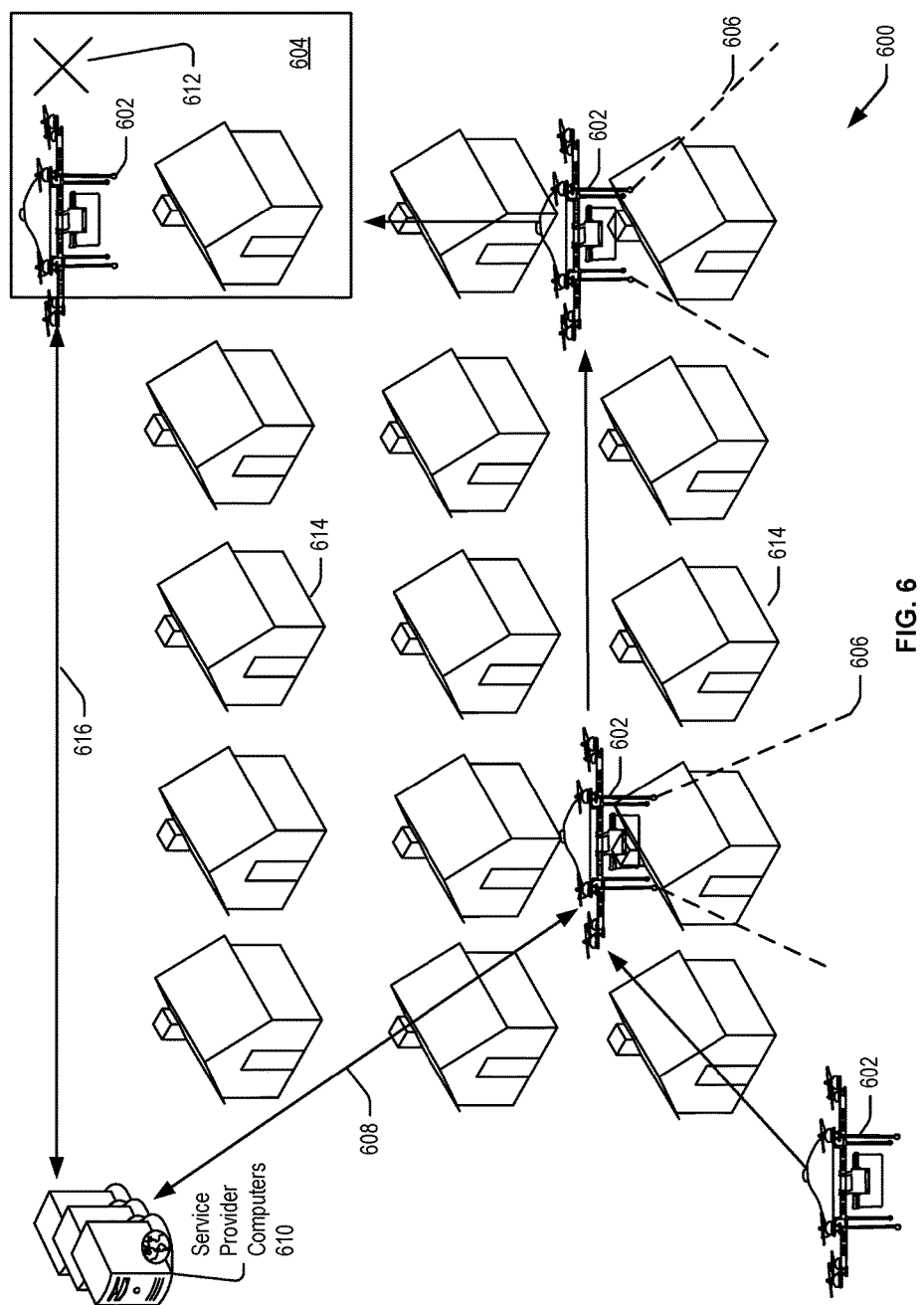
FIG. 6 illustrates an example environment for a marker and landing zone verification feature for a UAV delivering an item, according to embodiments.

FIG. 6 illustrates an example environment for a marker and landing zone verification feature for a UAV delivering an item, according to embodiments. FIG. 6 illustrates an example dataflow 600 for a flight plan verification feature described herein for a UAV attempting to deliver an item.

FIG. 6 includes a UAV 602 in flight to deliver an item to a delivery location 604. During flight the UAV 602 may capture 606 a series of images and provide 608 the series of images to service provider computers 610. In accordance with at least one embodiment, the service provider computers 610 may be configured to generate, update, and maintain one or more image filters that may serve as image templates to compare incoming images to and identify a correct current position of UAV 602 during flight in a generated flight plan. In embodiments, the service provider computers 610 may extract or abstract certain information from the series of images to generate an image template. In some embodiments, the image template may include a 2D map of a particular location, such as delivery location 604, that identifies a landing zone and a landing marker 612 for the particular location 604.

In various embodiments, the service provider computers 610 may generate and maintain image filters and derive image templates for a plurality of locations, such as locations 614. The plurality of locations 614 may represent a neighborhood, town, or city that includes users that have opted-in for UAV deliveries from an electronic marketplace. In various embodiments, the image filters generated by the service provider computers 610 may include a map of obstructions or potential obstructions for UAV 602 such as radio towers, high rise buildings, tall trees, or other suitable obstacles that may include objects or dimensions of objects not conveyed by global positioning satellite information. In embodiments, the image filters may be utilized to verify a flight path or flight plan for a UAV 602 during flight to deliver an item. For example, the UAV 602 can periodically or continuously provide 608 captured images to the server computer which may be compared to the plurality of image filters to verify the UAV's 602 location, heading, and path.

In some embodiments, the image filters may also be utilized to verify a particular delivery location 604 by comparing an image captured by UAV 602 upon arriving 616 at the particular delivery location 604 to the image filter for the particular delivery location 604. In embodiments, the image processing algorithms implemented by the service provider computers 610 may perform a matching or comparison operation that identifies differences between two images and utilizes a threshold maintained for a location to determine whether the images are similar within a statistical average and therefore verifying that the UAV 602 has indeed arrived at the correct location (particular delivery location 604), or whether the images are different, do not match, etc., therefore verifying that the UAV 602 has not arrived at the correct location. In embodiments, an image filter may be associated with a user or customer profile. Further, trends associated with an image filter may be identified, captured, and communicated to a user for security and/or safety reasons. For example, an image filter derived from a series of images captured by a UAV during multiple delivery missions may identify a slope of the surrounding terrain of a user's home. Such information may be communicated to an associated user.

Figure 7:
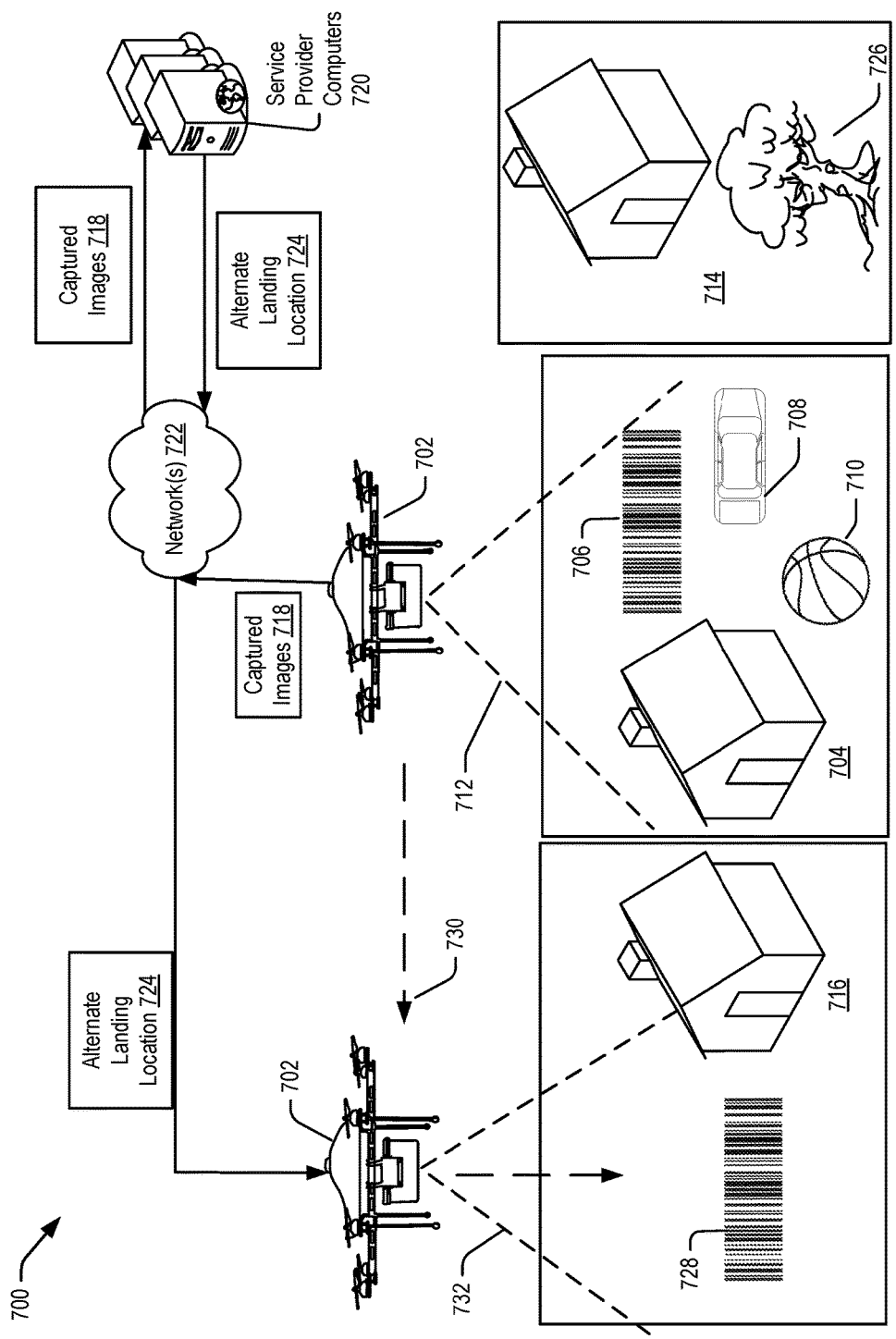
FIG. 7 illustrates an example environment for a marker and landing zone verification feature for a UAV delivering an item, according to embodiments.

FIG. 7 illustrates an example environment for a marker and landing zone verification feature for a UAV delivering an item, according to embodiments. FIG. 7 illustrates an example dataflow 700 for an object detection and alternate landing zone identification feature described herein for a UAV attempting to deliver an item. FIG. 7 includes a UAV 702 attempting to deliver an item to a delivery location 704 that includes a landing marker 706 and one or more objects and/or items 708 and 710. The UAV 702 may be configured to capture 712 one or more images of the delivery location 704 including an image of the landing marker 706, and objects 708 and 710. In some embodiments, the UAV 702 may perform a fly by or recon maneuver that captures images of nearby locations or neighbor locations such as locations 714 and 716. In embodiments, the UAV 702 may transmit the captured images 718, including the images for delivery location 704 and neighbor locations 714 and 716, to service provider computers 720 via networks 722.

In embodiments, the service provider computers 720 may be configured to identify an alternate landing location 724 and instructions that guide the UAV 702 to deliver the item ordered by a user at delivery location 704 to an alternate location. For example, in situations where a user is failing to respond to communications about removing or moving the items 708 and 710 from the delivery location 704, rather than abandoning the delivery mission, the service provider computers 720 may utilize the captured images 718 to identify an alternate landing location. In embodiments, the alternate landing locations may be other users that have opted-in for UAV deliveries or have identified themselves as capable alternatives for deliveries intended for delivery location 704. As illustrated in FIG. 7, the service provider computers 720 may identify, using the captured images 718, that the location 714 is unsuitable for delivering the item as the dimensions are incorrect and an object, such as tree 726 would serve as an obstruction and cause a safety hazard were the UAV 702 attempt to deliver the item to the location 714.

Instead, the service provider computers 720 may identify that alternative location 716 is suitable for delivering the item intended for delivery location 704. For example, the captured images 718 may be analyzed by service provider computers 720 to verify dimensions appropriate for the UAV 702 and associated item, and further identify another landing marker 728 within alternate location 716. In accordance with at least one embodiment, the alternate landing location 724 determined by the service provider computers 720 may be communicated to the UAV 702 that guides and/or instructs movement 730 of the UAV 702 to deliver the item at alternate landing location 716. In embodiments, the UAV 702 may utilize image capture components to verify 732 a landing zone and the landing marker 728 within the alternate landing location 716. The UAV 702 may utilize the landing marker 728 to guide its descent to the alternate landing location 716 and deliver the item. Upon delivering the item, a notification or message may be provided by the service provider computers 720 to the user associated with the delivery location 704 and the user associated with alternative landing location 716 that notifies them of the delivery to said location and the reasons why it was delivered to alternative landing location 716. In embodiments, users that have opted-out from UAV deliveries would not be considered suitable locations for an alternative landing location. Further, a user associated with an original delivery location may opt-out of delivering to a neighbor or alternative location and would therefore the item be returned and the delivery mission aborted.

Figure 8:
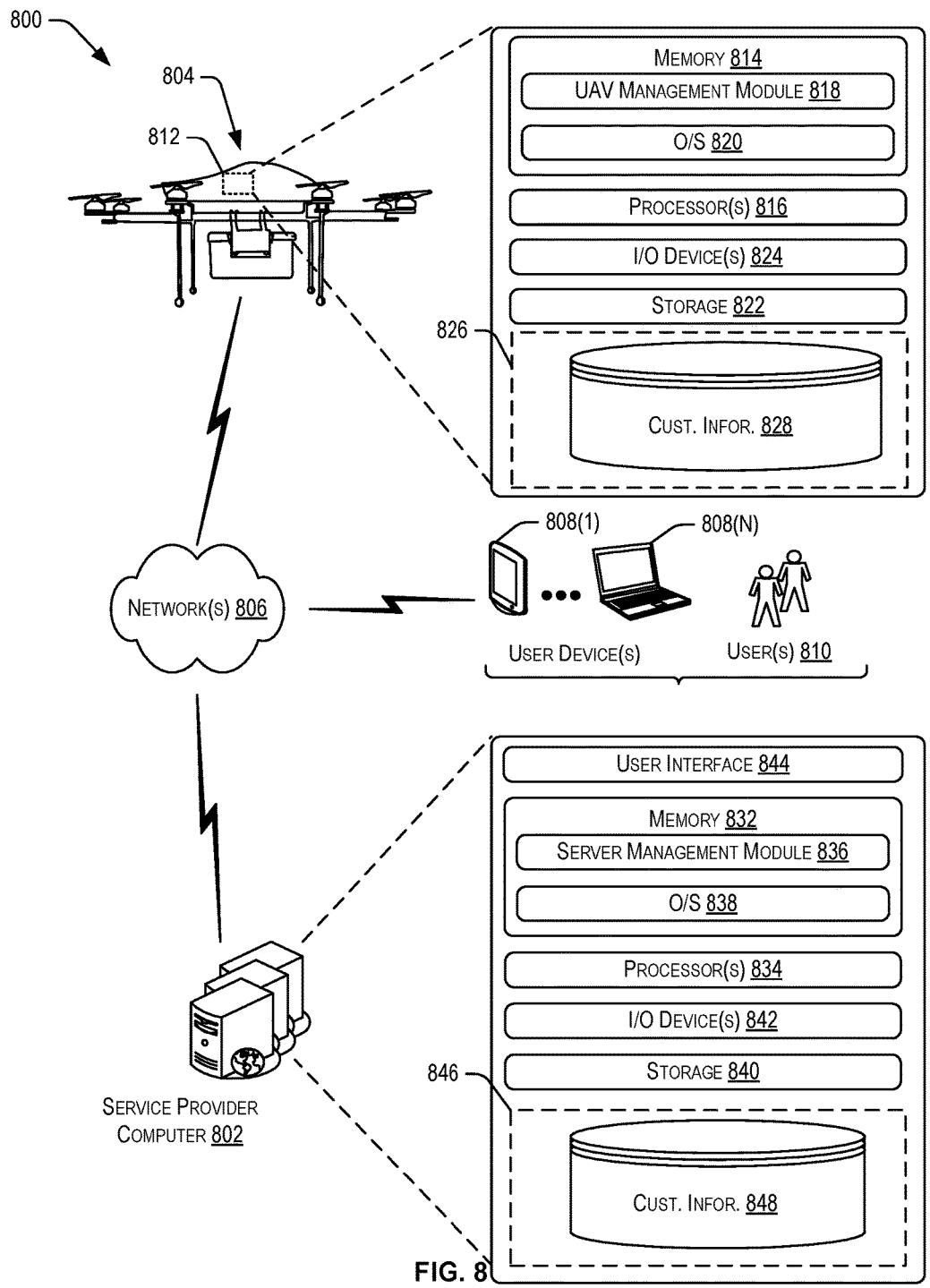
FIG. 8 illustrates an example computing architecture for implementing the marker and landing zone verification feature, according to embodiments.

FIG. 8 illustrates an example computing architecture for implementing the marker and landing zone verification feature, according to embodiments. The architecture 800 may include a service provider computer 802 (which may be an example of service provider computer(s) 114, 320, 424, 522, 610, or 720). The service provider computer 802 may be included as part of an electronic marketplace (not shown) and interface with purchase and delivery services of the electronic marketplace. In this manner, the service provider computer 802 may coordinate delivery of items via UAVs, such as UAV 804, to customers of the electronic marketplace. The UAV 804 is an example of the UAV 200 discussed previously. In some examples, the service provider computer 802 may be a stand-alone service operated on its own or in connection with an electronic marketplace. In either example, the service provider computer 802 may be in communication with the UAV 804 via one or more network(s) 806 (hereinafter, "the network 306"). The network 806 may include any one or a combination of many different types of networks, such as cable networks, the Internet, wireless networks, cellular networks, radio networks, and other private and/or public networks. Thus, the service provider computer 802 may be configured to provide back-end control of the UAV 804 prior to, during, and after completion of its delivery plan. As discussed previously, in some examples, the UAV 804 may be configured to accomplish its delivery plan (e.g., deliver its payload) with little to no communication with the service provider computer 802.

User devices 808(1)-808(N) (hereinafter, "the user device 808") may also be in communication with the service provider computer 802 and the UAV 804 via the network 806. The user device 808 may be operable by one or more human users 810 (hereinafter, "the human user 810") to access the service provider computer 802 (or an electronic marketplace) and the UAV 804 via the network 806. In some examples, such connectivity may enable the human user 810 to interact with the UAV 804 according to techniques described herein. The user device 808 may be any suitable device capable of communicating with the network 806. For example, the user device 808 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 808 may be in communication with the service provider computer 802 via one or more web servers constituting an electronic marketplace (not shown) connected to the network 806 and associated with the service provider computer 802.

Turning now to the details of the UAV 804, the UAV 804 may include an onboard computer 812 including at least one memory 814 and one or more processing units (or processor(s)) 816. The processor(s) 816 may be implemented as appropriate in hardware, computer-executable instructions, software, firmware, or combinations thereof. Computer-executable instruction, software or firmware implementations of the processor(s) 816 may include computer-executable or machine-executable instructions written in any suitable programming language to perform the various functions described. The memory 814 may include more than one memory and may be distributed throughout the onboard computer 812. The memory 814 may store program instructions (e.g., UAV management module 818) that are loadable and executable on the processor(s) 816, as well as data generated during the execution of these programs. Depending on the configuration and type of memory including the UAV management module 818, the memory 814 may be volatile (such as random access memory (RAM)) and/or non-volatile (such as read-only memory (ROM), flash memory, or other memory). The UAV management module 818 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM. Turning to the contents of the memory 814 in more detail, the memory 814 may include an operating system 820 and one or more application programs, modules or services for implementing the features disclosed herein including at least the UAV management module 818. In embodiments, the UAV management module 818 may be configured to utilize image processing algorithms to identify landing zones, landing markers within a landing zone, designate potential landing zones, determine alternate landing zones, communicate with a user (customer 810) about moving an object from a landing zone, moving a landing marker to a different area of a delivery location to generate a new landing zone, generate image filters for a plurality of locations, and verify flight paths/plans for the UAV 804 and a landing zone utilizing said image filters as described herein.

In some examples, the onboard computer 812 may also include additional storage 822, which may include removable storage and/or non-removable storage. The additional storage 822 may include, but is not limited to, magnetic storage, optical disks, and/or tape storage. The disk drives and their associated computer-readable media may provide non-volatile storage of computer-readable instructions, data structures, program modules, and other data for the computing devices.

The memory 814 and the additional storage 822, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 812. The modules of the onboard computer 812 may include one or more components. The onboard computer 812 may also include input/output (I/O) device(s) and/or ports 824, such as for enabling connection with a keyboard, a mouse, a pen, a voice input device, a touch input device, a display, speakers, a printer, or other I/O device. The I/O device(s) 824 may enable communication with the other systems of the UAV 804 (e.g., other parts of the control system, power system, communication system, navigation system, propulsion system, and the retaining system).

The onboard computer 812 may also include data store 826. The data store 826 may include one or more databases, data structures, or the like for storing and/or retaining information associated with the UAV 804. In some examples, the data store 826 may include databases, such as customer information database 828. Within the customer information database 828 may be stored any suitable customer information that may be used by the UAV 804 in implementing and/or affecting its delivery plan. For example, the customer information database 828 may include profile characteristics for the human user 810. The profile characteristics may include a shipping address, images captured by UAV 804 for a delivery location or area associated with the customer 810, or an image filter that serves as an image template for the delivery location, landing zone, or area associated with customer 810.

Turning now to the details of the user device 808. The user device 808 may be used by the human user 810 for interacting with the service provider computer 802 and, in some cases, the UAV 804. The user device 808 may therefore include a memory, a processor, a user-interface, a web-service application, and any other suitable feature to enable communication with the features of architecture 800. The web service application may be in the form of a web browser, an application programming interface (API), virtual computing instance, or other suitable application. In some examples, when the service provider computer 802 is part of, or shares an association with, an electronic marketplace, the user device 808 may be used by the human user 810 for procuring one or more items from the electronic marketplace. The human user 810 may request delivery of the purchased item(s) using the UAV 804, or the service provider computer 802 may coordinate such delivery on its own. In some examples, the human user 810 may use the user device 308 to obtain or capture one or more images of a delivery location or area that includes a landing zone or landing marker. For example, the human user 810 may utilize the user device 808 to capture an image or video of an associated landing zone and maker to aid in identifying the landing marker to enable guidance for the UAV 804 in delivering an item. The human user 810 may receive instructions from the service provider computer 802 and/or UAV 804 to move a landing marker or to move objects in a landing zone to enable safe delivery of an item.

Turning now to the details of the service provider computer 802, the service provider computer 802 may include one or more service provider computers, perhaps arranged in a cluster of servers or as a server farm, and may host web service applications. These servers may be configured to host a website (or combination of websites) viewable via the user device 808. The service provider computer 802 may include at least one memory 832 and one or more processing units (or processor(s)) 834. The processor(s) 834 may be implemented as appropriate in hardware, computer-executable instructions, software, firmware, or combinations thereof. Computer-executable instruction, software or firmware implementations of the processor(s) 834 may include computer-executable or machine-executable instructions written in any suitable programming language to perform the various functions described. The memory 832 may include more than one memory and may be distributed throughout the service provider computer 802. The memory 832 may store program instructions (e.g., server management module 836) that are loadable and executable on the processor(s) 834, as well as data generated during the execution of these programs. Depending on the configuration and type of memory including the server management module 836, the memory 832 may be volatile (such as random access memory (RAM)) and/or non-volatile (such as read-only memory (ROM), flash memory, or other memory). The service provider computer 802 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 832 may include multiple different types of memory, such as static random access memory (SRAM), dynamic random access memory (DRAM), or ROM. Turning to the contents of the memory 832 in more detail, the memory 832 may include an operating system 838 and one or more application programs, modules or services for implementing the features disclosed herein including at least the server management module 836. The server management module 836, in some examples, may function similarly to the UAV management module 818. For example, when the UAV 804 is in network communication with the service provider computer 802, the UAV 804 may receive at least some instructions from the service provider computer 802 as the server management module 836 is executed by the processors 834. In some examples, the UAV 804 executes the UAV management module 818 to operate independent of the service provider computer 802. The server management module 836 and UAV management module 818 may be an example of management system 202 of FIG. 2.

In some examples, the service provider computer 802 may also include additional storage 840, which may include removable storage and/or non-removable storage. The additional storage 840 may include, but is not limited to, magnetic storage, optical disks, and/or tape storage. The disk drives and their associated computer-readable media may provide non-volatile storage of computer-readable instructions, data structures, program modules, and other data for the computing devices.

The memory 832 and the additional storage 840, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer 802. The modules of the service provider computer 802 may include one or more components. The service provider computer 802 may also include input/output (I/O) device(s) and/or ports 842, such as for enabling connection with a keyboard, a mouse, a pen, a voice input device, a touch input device, a display, speakers, a printer, or other I/O device.

In some examples, the service provider computer 802 may include a user interface 844. The user interface 844 may be utilized by an operator, or other authorized user to access portions of the service provider computer 802. In some examples, the user interface 844 may include a graphical user interface, web-based applications, programmatic interfaces such as application programming interfaces (APIs), or other user interface configurations. The service provider computer 802 may also include data store 846. The data store 846 may include one or more databases, data structures, or the like for storing and/or retaining information associated with the service provider computer 802. The data store 846 may include databases, such as customer information database 848. The customer information database 848 may include similar information as the customer information database 828. The service provider computer 802 may store a larger amount of information in the data store 846 than the onboard computer 812 is capable of storing in the data store 826. Thus, in some examples, at least a portion of the information from the databases in the data store 846 is copied to the databases of the data store 826, e.g., periodically, occasionally, in connection with an event, or otherwise. In this manner, the data store 826 may have up-to-date information, without having to maintain the databases. In some examples, this information may be transferred as part of a delivery plan prior to the UAV 804 beginning a delivery mission.

FIGS. 9-13 illustrate example flows 900-1300 for marker and landing zone verification for a UAV delivering an item, according to embodiments. In the illustrative operations, some of the operations or functions may be embodied in, and fully or partially automated by, a management component (e.g., UAV management module 818 or server management module 836 of FIG. 8). Nevertheless, other or a combination of other electronic and/or mechanical components may be additionally or alternatively used. Also, while the operations are illustrated in a particular order, it should be understood that no particular order is necessary and that one or more operations may be omitted, skipped, and/or reordered. Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 9:
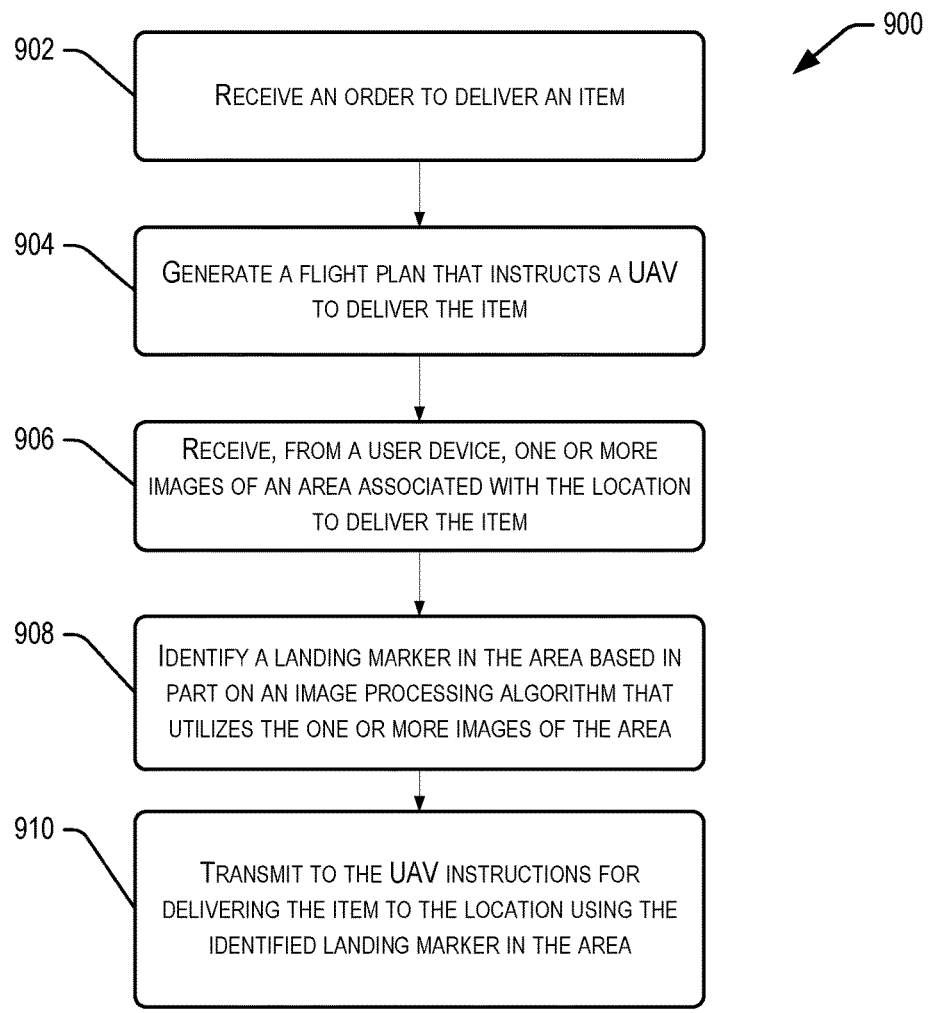
FIG. 9 illustrates an example flow for a marker and landing zone verification feature for a UAV delivering an item, according to embodiments.

The example flow 900 of FIG. 9 may start at operation 902 where a computer system may receive an order to deliver an item. The item may be offered by an electronic marketplace and the computer system may be associated with the electronic marketplace. At operation 904, a flight plan that instructs a UAV to deliver the item may be generated. The flight plan may identify a delivery location associated with a user that placed the order for the item. At operation 906, one or more images of an area associated with the delivery location may be received by the computer system from a user device of a user associated with the delivery location. For example, the user device may be configured to utilize one or more image capture components that are further configured to capture or obtain images, videos, or live streams of an area of the delivery location that may include a landing zone and/or landing marker.

At operation 908, a landing marker in the area may be identified based in part on an image processing algorithm that utilizes the one or more images of the area captured by the user device. In some embodiments, the image processing algorithm is implemented by the computer system and further uses images captured and provided by the UAV during flight to deliver the item. In various embodiments, the landing marker may include a barcode, QR code, or other machine readable unique identifier. The example flow 900 may conclude at operation 910 by transmitting, by the computer system and to the UAV, instructions for delivering the item to the delivery location using the identified landing marker in the area. In some embodiments, the instructions may guide the UAV to land in the landing zone, guided by the identified landing marker, and release the item in the landing zone. In various embodiments, the UAV may be instructed to hover a certain distance from the landing marker and lower the item via a tether mechanism onto the landing marker in the landing zone.

Figure 10:
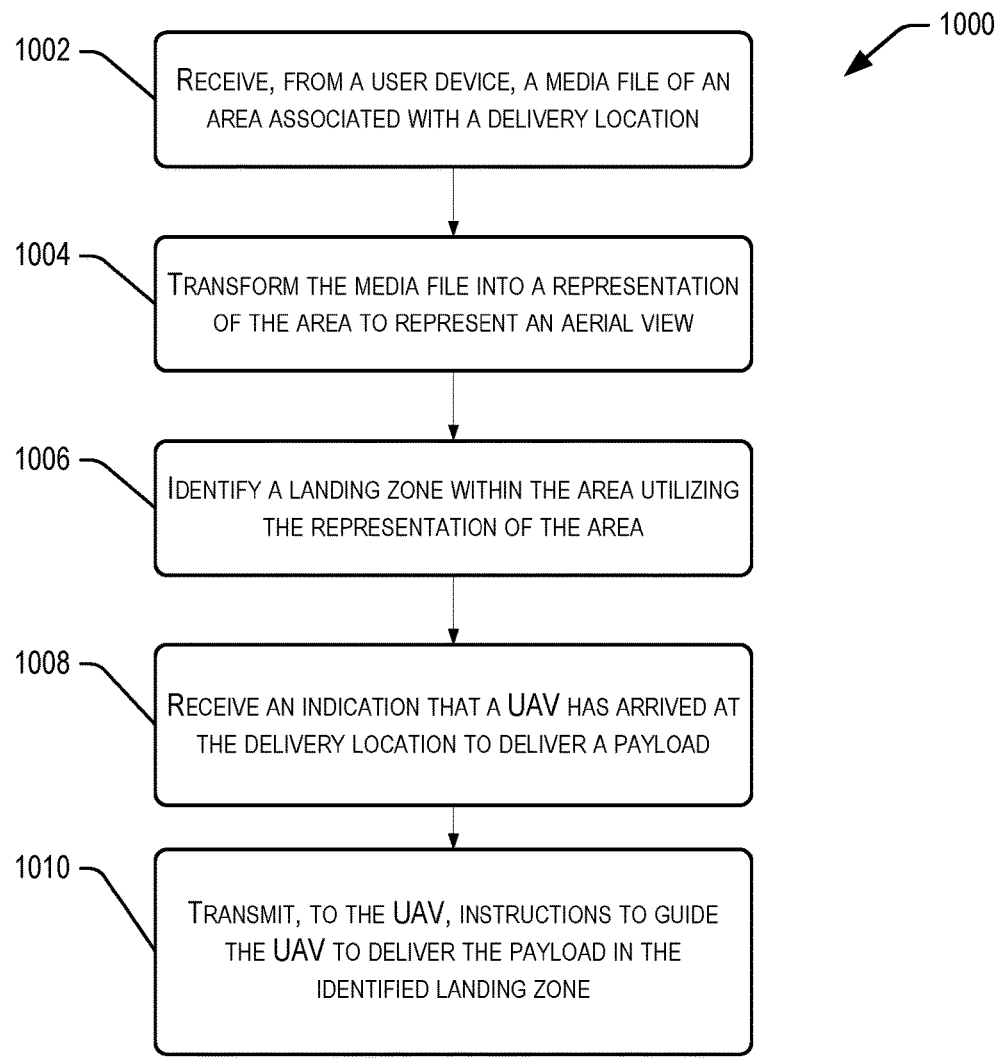
FIG. 10 illustrates an example flow for a marker and landing zone verification feature for a UAV delivering an item, according to embodiments.

The example flow 1000 of FIG. 10 may start at operation 1002 by receiving, from a user device, a media file of an area associated with a delivery location. As described herein, the media file may include a video, stream, or image of the area. At operation 1004, the media file may be transformed, by a computer system, into a representation of the area from an aerial point of view. For example, image processing techniques may utilize the images captured by a UAV during flight to deliver the item and the images provided by user device, to generate an aerial view representation of the area associated with the delivery location. In accordance with at least one embodiment, the representation of the area may include a 2D or 3D depth map of the area that includes one or more objects. At operation 1006 a landing zone may be identified within the area, by the computer system, utilizing the generated aerial view representation of the area. In some embodiments, a landing zone and a landing marker may be identified within the area.

At operation 1008 an indication that the UAV has arrived at the delivery location may be received by the computer system. In some embodiments, the UAV may identify that it has arrived at the delivery location using GPS coordinates associated with the delivery location and an associated GPS component for the UAV. In various embodiments, the UAV may identify that it has arrived at the delivery location based in part on a comparison of recently captured images and an image filter for the delivery location that is maintained by the computer system. The example flow 1000 may conclude at 1010 by transmitting, from the computer system and to the UAV, instructions to guide the UAV to deliver the payload in the identified landing zone. In some embodiments, the UAV may utilize one or more associated sensors to verify an appropriate landing surface (such as cement or grass) before approaching the landing zone to deliver the item. One or more policies maintained by the computer system may identify prohibited landing surfaces such as water or mud.

Figure 11:
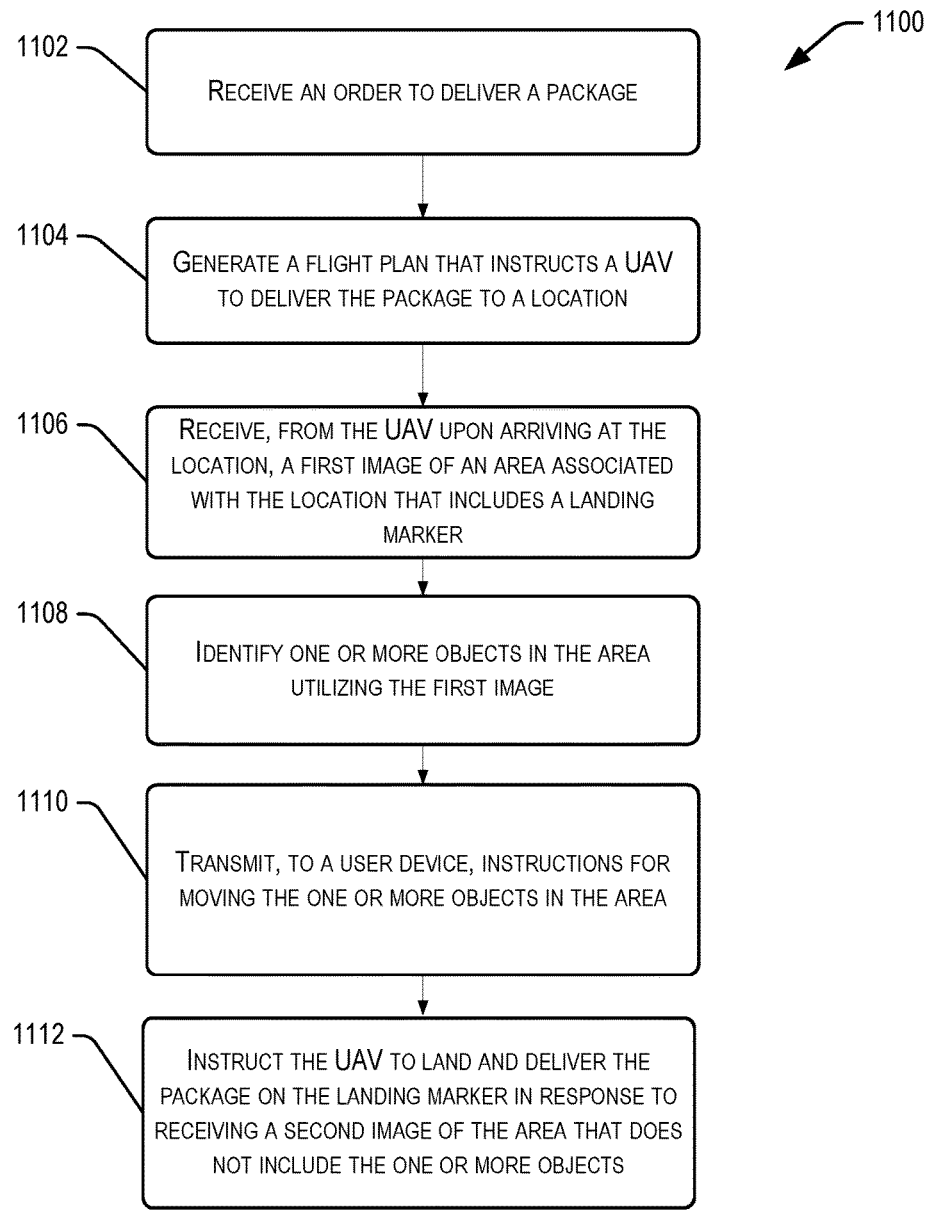
FIG. 11 illustrates an example flow for a marker and landing zone verification feature for a UAV delivering an item, according to embodiments.

The example flow 1100 of FIG. 11 may start at operation 1102 by receiving an order to deliver a package. A user that has opted-in for a UAV delivery service may order an item (package) for delivery from an electronic marketplace. At operation 1104, a computer system may generate a flight plan that instructs a UAV to deliver the package to a delivery location. The delivery location may be determined based in part on information associated with the user such as an address, GPS coordinates, etc. At operation 1106, the computer system may receive, from the UAV upon arriving at the delivery location, a first image of an area associated with the delivery location that includes a landing marker. As described herein, the computer system may also receive one or more images, videos, or a data stream from a user device of a user associated with the delivery location. All the provided images from the UAV and user device may be utilized by the computer system and image processing algorithms as described herein.

At operation 1108, the computer system may identify one or more objects in the area utilizing the first image. In embodiments, the one or more objects may be identified by an image processing algorithm that utilizes item recognition techniques that further leverage an item catalog associated with an electronic marketplace. At operation 1110, the computer system may generate and transmit, to a user device of a user associated with the delivery location, instructions for moving the one or more objects in the area. For example, the instructions may identify the offending objects and include instructions for moving the objects a certain distance away from the landing marker. The instructions may notify the user that the objects are prohibiting the UAV from landing and delivering the item. In some examples, the instructions may include an image of the area with the offending objects highlighted, outlined, or otherwise identified for the ease of the user. The example flow 1100 may conclude at operation 1112 by instructing the UAV to land and deliver the package on the landing marker in response to receiving a second image of the area that does not include the one or more objects. In embodiments, the second image may be provided by the UAV or by a user device of the user.

Figure 12:
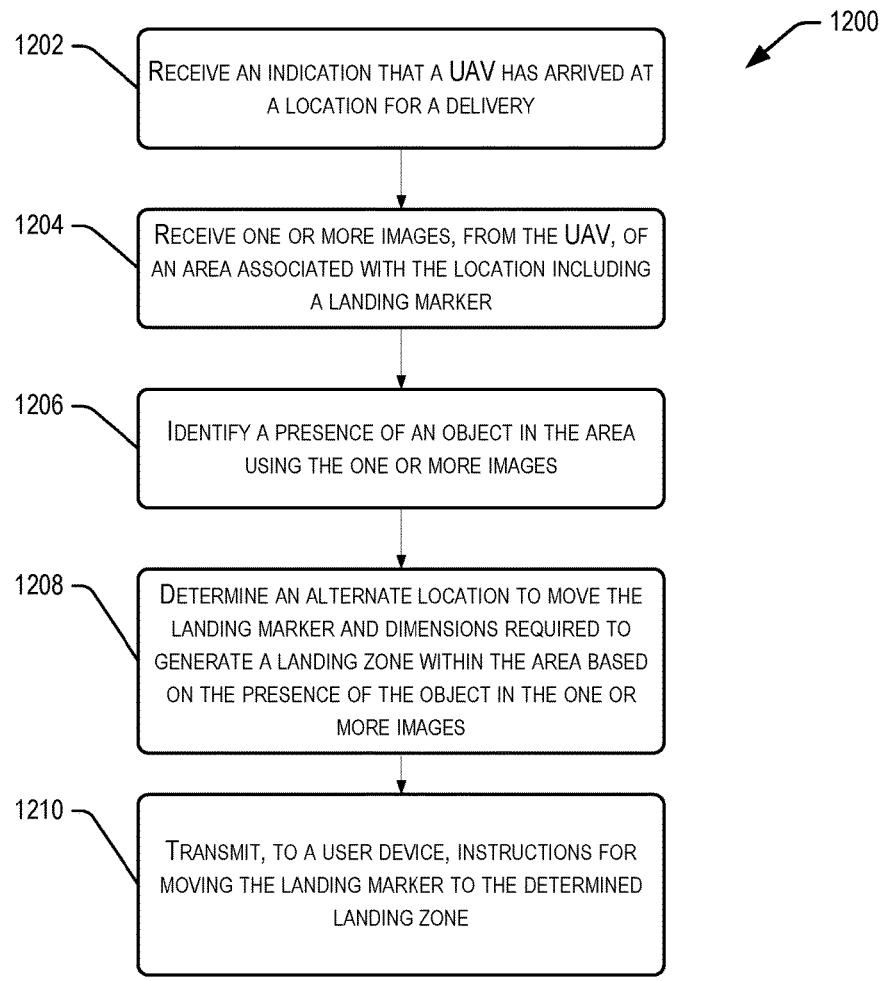
FIG. 12 illustrates an example flow for a marker and landing zone verification feature for a UAV delivering an item, according to embodiments.

The example flow 1200 of FIG. 12 may begin at operation 1202 by receiving, by a computer system, an indication that a UAV has arrived at a location for a delivery. At operation 1204 the computer system may receive one or more images, from the UAV, of an area associated with the location including a landing marker. The area may include a designated landing zone based on the proximity to the landing marker. At operation 1206, the computer system may identify the presence of an object in the area using the one or more images. In embodiments, the computer system or UAV may utilize image processing algorithms including item recognition techniques to identify objects within the area. At operation 1208, the computer system may determine an alternate location to move the landing marker and dimensions required to generate a landing zone within the area based on the presence of the object in the one or more images.

In embodiments, the computer system may utilize images captured by the UAV or provided by a user device, to identify a potential landing zone within the area associated with the delivery location. For example, information provided by the user about the delivery location may be utilized to determine dimensions required to generate a new landing zone within the area. The example flow 1200 may conclude at operation 1210 by transmitting, to a user device, instructions for moving the landing marker to the determined landing zone. In embodiments, the computer system may provide data objects and messages to an application of the user device that can in turn present an augmented reality presentation onto the area to guide the user in moving the landing marker to the newly identified landing zone. The newly identified landing zone may be captured in an image by the UAV to determine the absence of any offending objects. In response to the new landing zone being generated, instructions may be provided to the UAV to land and deliver the item guided by the now moved landing marker and no longer obstructed by offending items.

Figure 13:
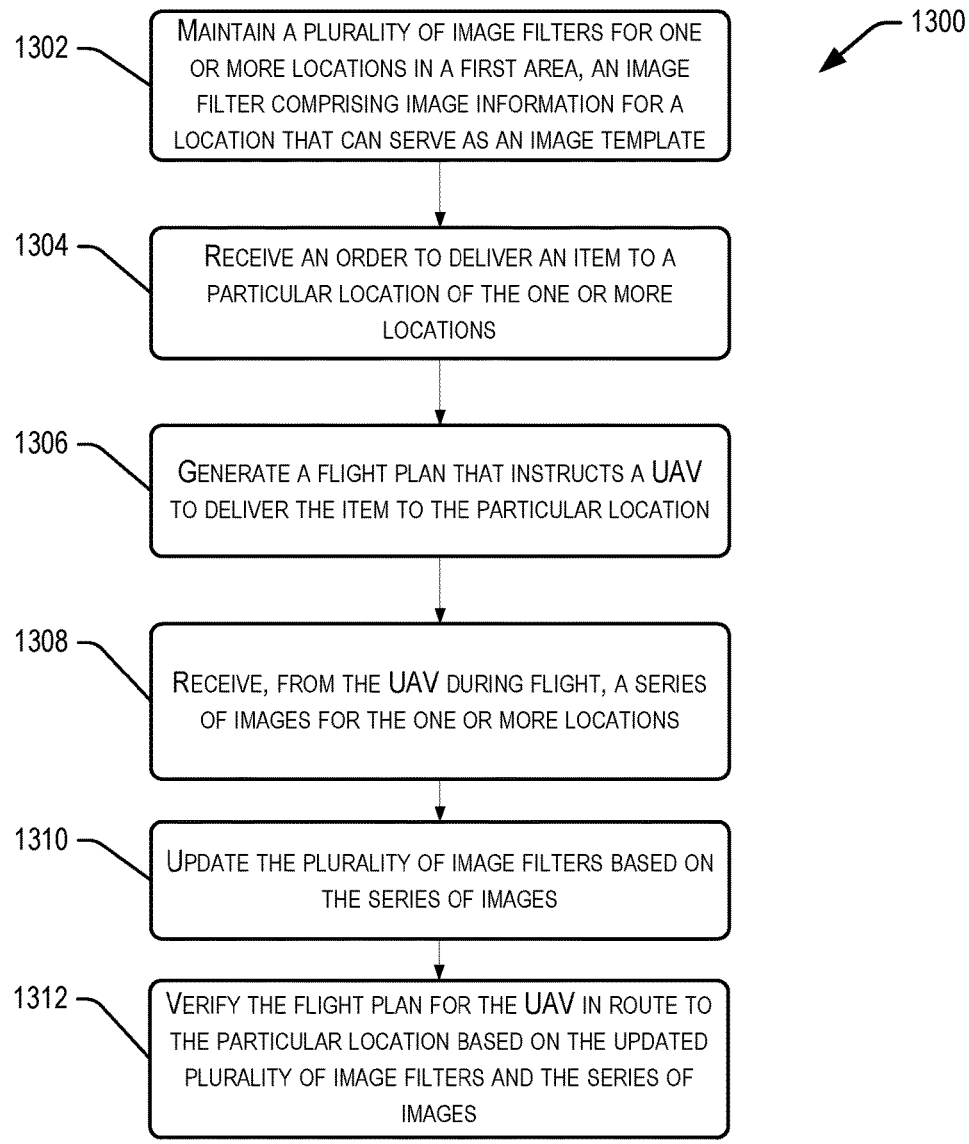
FIG. 13 illustrates an example flow for a marker and landing zone verification feature for a UAV delivering an item, according to embodiments.

The example flow 1300 of FIG. 13 may begin at 1302 by maintaining, by a computer system, a plurality of image filters for one or more locations in a first area, where an image filter may comprise image information for a location that can serve as an image template. In embodiments, the one or more locations may correspond to delivery locations and the first area may include a city, town, or neighborhood. At operation 1304, the computer system may receive an order to deliver an item to a particular location of the one or more locations. For example, a user may request delivery of an item, via UAV, from an electronic marketplace. At operation 1306, the computer system may generate a flight plan that instructs a UAV to deliver the item to the particular location. In embodiments, the flight plan may identify certain modulations of the propellers or certain altitudes to maintain when flying over, by, or near particular locations of the one or more locations that may correspond to users that have opted-out from UAV deliveries or do not wish to have UAVs flying through their property.

At operation 1308, the computer system may receive, from the UAV during flight, a series of images for the one or more locations. The series of images may be captured by one or more image capture components associated with the UAV which may be configured to operate as a stereo camera. At operation 1310, the computer system may analyze the series of images and update the plurality of image filters for the corresponding locations based in part on the received series of images. In embodiments, the computer system may utilize image processing algorithms to extract unnecessary information to update the image filters. The example flow 1300 may conclude at 1312 by verifying the flight plan for the UAV, in route to the particular location, based in part on the updated plurality of image filters and subsequently captured images by the UAV or the previously captured series of images. In embodiments, the computer system may also verify a particular delivery location based in part on a captured image of the particular delivery location and an image filter for the particular delivery location. In some embodiments, the UAV may be instructed to land deliver the item to the particular delivery location upon verifying the delivery location utilizing the image filter.

Figure 14:
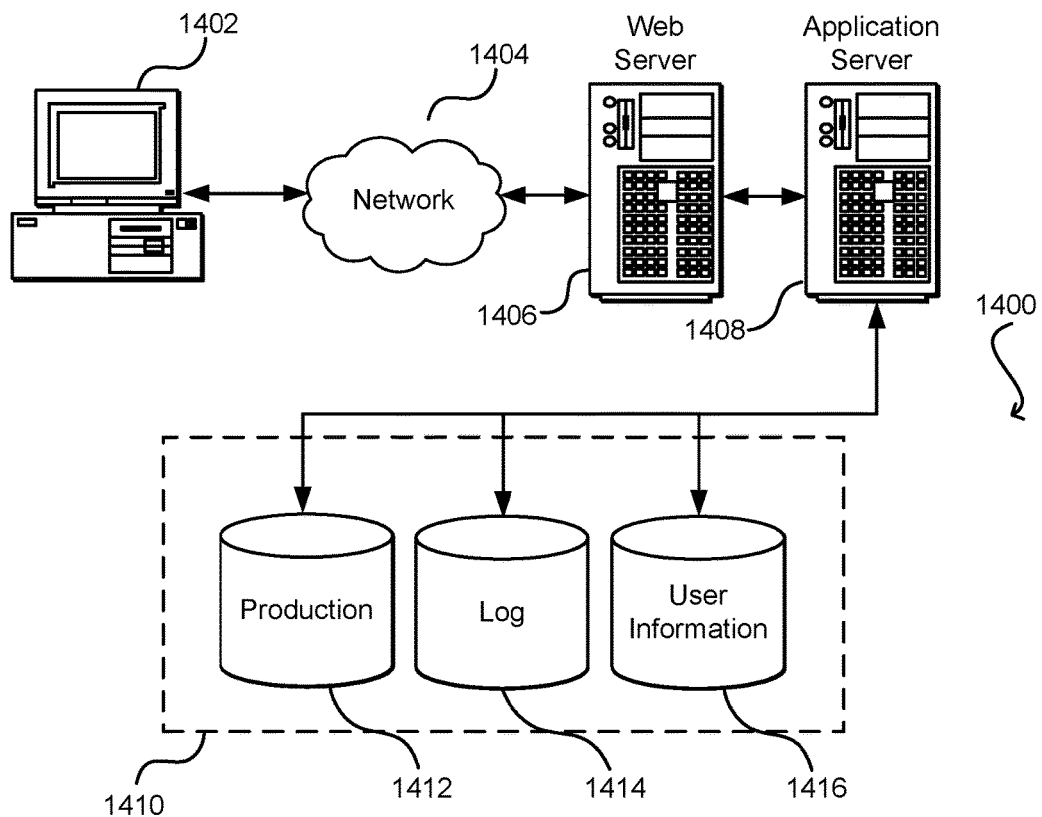
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    maintaining, by a computer system, a plurality of image filters for one or more locations in a first area, an image filter of the plurality of image filters comprising image information for a location of the one or more locations that can serve as an image template;
    receiving, by the computer system, an order to deliver an item to a particular location of the one or more locations;
    generating, by the computer system, a flight plan that instructs an unmanned aerial vehicle (UAV) to deliver the item to the particular location;
    receiving, by the computer system and from the UAV, a series of images for the one or more locations during flight to the particular location;
    updating, by the computer system, the plurality of image filters based at least in part on the series of images;
    verifying, by the computer system, the flight plan for the UAV in route to the particular location based at least in part on the updated plurality of image filters and the series of images;
    identifying, by the computer system, that an obstruction is in a landing zone of the particular location based at least in part on the updated plurality of image filters and the series of images; and
    transmitting, by the computer system and to a user device, a notification that indicates the obstruction in the landing zone based at least in response to identifying the obstruction.

2. The computer-implemented method of claim 1, wherein the image filter is generated, by the computer system, by removing certain objects from the image information.

3. The computer-implemented method of claim 1, further comprising generating, by the computer system, a new flight plan in response to receiving, from the user device, an opt-out for UAV deliveries, the new flight plan generated based at least in part on the updated plurality of image filters.

4. The computer-implemented method of claim 3, wherein the new flight plan includes instructing the UAV to climb to a certain altitude when flying by locations associated with opt-outs for the UAV deliveries.

5. The computer-implemented method of claim 1, further comprising:
receiving, by the computer system and from the UAV, information identifying an equipment failure for the UAV;
generating, by the computer system, a new landing location based at least in part on the information and the updated plurality of image filters; and
instructing, by the computer system, the UAV to land at the new landing location.

6. The computer-implemented method of claim 1, wherein the plurality of image filters for the one or more locations in the first area identify one or more obstructions to the flight plan in the first area.

7. The computer-implemented method of claim 6, further comprising generating, by the computer system, a map of the one or more obstructions.

8. The computer-implemented method of claim 7, further comprising updating the flight plan for the UAV in route to the particular location based at least in part on the map of the one or more obstructions.

9. A computer-implemented method, comprising:
receiving, by a computer system and from an unmanned aerial vehicle (UAV), one or more images captured by the UAV during flight within an area;
extracting, by the computer system, first information from the one or more images using an image processing algorithm;
generating, by the computer system, a plurality of image filters to serve as image templates for one or more locations that correspond to previous deliveries by the UAV, the one or more locations within the area;
receiving, by the computer system, an order to deliver an item to a particular location of the one or more locations;
verifying, by the computer system, a flight path for the UAV during flight by the UAV to deliver the item based at least in part on updated one or more images captured by the UAV and the plurality of image filters;
identifying, by the computer system, that an obstruction is in a landing zone of the particular location based at least in part the updated one or more images captured by the UAV and the plurality of image filters; and
transmitting, by the computer system and to a user device, a first notification that identifies the obstruction in the landing zone in response to identifying the obstruction.

10. The computer-implemented method of claim 9, wherein extracting the first information from the one or more images using the image processing algorithm includes removing certain objects and certain information from the one or more images.

11. The computer-implemented method of claim 9, further comprising generating, by the computer system, a new flight path in response to receiving second information identifying an entity opting-out from UAV deliveries.

12. The computer-implemented method of claim 11, wherein the new flight path includes instructions for modulating propellers associated with the UAV to generate an expected sound when flying within a certain distance from the entity.

13. The computer-implemented method of claim 9, further comprising:
receiving, by the computer system and from the UAV, second information identifying an equipment failure for the UAV;
generating, by the computer system, a new landing location based at least in part on the second information and the updated one or more images captured by the UAV and the plurality of image filters; and
instructing, by the computer system, the UAV to land at the new landing location.

14. The computer-implemented method of claim 9, further comprising transmitting, by the computer system and to the user device, a second notification that identifies an update to a particular image filter for the particular location when the update to the particular image filter exceeds a certain threshold for the particular location.

15. The computer-implemented method of claim 9, wherein the image templates for the one or more locations include identifications for one or more obstructions to the UAV in the flight path.

16. An unmanned aerial vehicle (UAV), comprising:
an image capture component;
a set of propellers associated with a propulsion system configured to provide propulsion for the UAV; and
a computing system configured to manage the propulsion system during a flight associated with a delivery of a payload and further configured to instruct the UAV to:
capture, via the image capture component, one or more images of an area during flight;
extract, by the computing system, first information from the one or more images using an image processing algorithm;
generate, by the computing system, a plurality of image filters to serve as image templates for one or more locations in the area;
verify, by the computing system, a flight path for the UAV to deliver an item based at least in part on the plurality of image filters and updated one or more images of the one or more locations in the area;
identify an obstruction in a landing zone of a particular location of the one or more locations based at least in part on the plurality of image filters and the updated one or more images; and
transmit, to a user device, a notification that identifies the obstruction in the landing zone in response to identifying the obstruction.

17. The UAV of claim 16, wherein the computing system is further configured to verify the landing zone for the UAV to deliver the item based at least in part on a particular image filter of the plurality of image filters and the updated one or more images of the one or more locations in the area.

18. The UAV of claim 16, wherein the obstruction in the landing zone is illuminated using one or more colored lights.

* * * * *